United States Patent
Miyahara et al.

(10) Patent No.: US 10,661,811 B2
(45) Date of Patent: May 26, 2020

(54) VEHICLE INFORMATION DISPLAY CONTROL DEVICE, AND METHOD FOR DISPLAYING AUTOMATIC DRIVING INFORMATION

(71) Applicant: Mitsubishi Electric Corporation, Tokyo (JP)

(72) Inventors: Tadashi Miyahara, Tokyo (JP); Mitsuo Shimotani, Tokyo (JP); Satoru Inoue, Tokyo (JP); Yoshio Sato, Tokyo (JP); Yuki Sakai, Tokyo (JP); Yuji Karita, Tokyo (JP); Junichi Kimura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 177 days.

(21) Appl. No.: 15/747,954

(22) PCT Filed: Oct. 30, 2015

(86) PCT No.: PCT/JP2015/080681
§ 371 (c)(1),
(2) Date: Jan. 26, 2018

(87) PCT Pub. No.: WO2017/072939
PCT Pub. Date: May 4, 2017

(65) Prior Publication Data
US 2018/0215396 A1 Aug. 2, 2018

(51) Int. Cl.
*B60W 50/14* (2020.01)
*B60K 35/00* (2006.01)
(Continued)

(52) U.S. Cl.
CPC ............ *B60W 50/14* (2013.01); *B60K 35/00* (2013.01); *B60K 37/02* (2013.01); *B60W 50/082* (2013.01);
(Continued)

(58) Field of Classification Search
None
See application file for complete search history.

(56) References Cited

U.S. PATENT DOCUMENTS

2010/0296723 A1* 11/2010 Greer ..................... A61B 5/064
382/153
2014/0088814 A1 3/2014 You et al.
(Continued)

FOREIGN PATENT DOCUMENTS

JP 2001-199295 A 7/2001
JP 2001-199327 A 7/2001
(Continued)

*Primary Examiner* — Jwalant Amin
(74) *Attorney, Agent, or Firm* — Birch, Stewart, Kolasch & Birch, LLP

(57) ABSTRACT

A vehicle information display control device includes: an automatic driving information obtaining unit obtaining automatic driving information including information indicating that each actuator of a vehicle is in a manual control mode or an automatic control mode; and a display controller causing a display to display an image based on the automatic driving information. The display controller causes the display to display: an image of a manual driving device corresponding to the actuator; a manual-operation recalling image that is superimposed on the image of the manual driving device corresponding to an actuator in the manual control mode and that recalls an operation performed by a person; and an automatic-operation recalling image that is superimposed on the image of the manual driving device
(Continued)

corresponding to an actuator in the automatic control mode and that recalls an operation performed by a machine.

19 Claims, 15 Drawing Sheets

(51) Int. Cl.

| | | |
|---|---|---|
| *G06F 3/147* | (2006.01) | |
| *B60K 37/02* | (2006.01) | |
| *B60W 50/08* | (2020.01) | |
| *G05D 1/00* | (2006.01) | |
| *G06T 13/80* | (2011.01) | |
| *G09G 5/377* | (2006.01) | |

(52) U.S. Cl.
CPC ............ *G05D 1/0061* (2013.01); *G06F 3/147* (2013.01); *G06T 13/80* (2013.01); *G09G 5/377* (2013.01); *B60K 2370/155* (2019.05); *B60K 2370/16* (2019.05); *B60K 2370/172* (2019.05); *B60K 2370/175* (2019.05); *B60K 2370/182* (2019.05); *B60K 2370/193* (2019.05); *B60K 2370/31* (2019.05); *B60K 2370/52* (2019.05); *B60W 2050/146* (2013.01); *G05D 2201/0213* (2013.01); *G09G 2340/10* (2013.01); *G09G 2340/12* (2013.01); *G09G 2354/00* (2013.01); *G09G 2380/10* (2013.01)

(56) References Cited

U.S. PATENT DOCUMENTS

| | | | |
|---|---|---|---|
| 2016/0121907 A1* | 5/2016 | Otake | ................... B60W 50/14 701/23 |
| 2016/0231743 A1 | 8/2016 | Bendewald et al. | |
| 2017/0021837 A1 | 1/2017 | Ebina | |

FOREIGN PATENT DOCUMENTS

| | | |
|---|---|---|
| JP | 2014-65478 A | 4/2014 |
| JP | 2015-24746 A | 2/2015 |
| JP | 2015-93364 A | 5/2015 |
| JP | 2015-182525 A | 10/2015 |
| JP | 2015-182624 A | 10/2015 |
| JP | 2016-90274 A | 5/2016 |
| WO | WO 2014/085380 A1 | 6/2014 |
| WO | WO 2015/151243 A1 | 10/2015 |

* cited by examiner

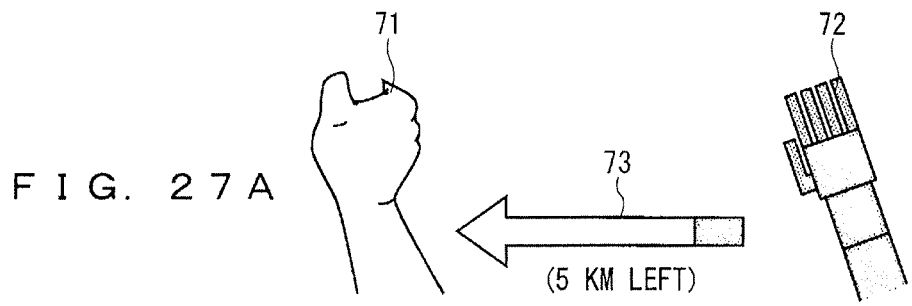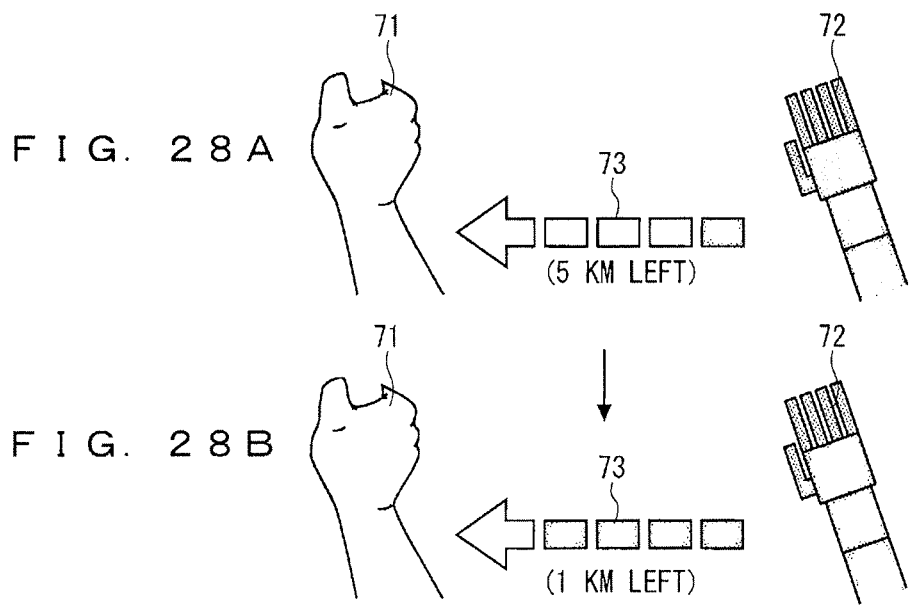

VEHICLE INFORMATION DISPLAY CONTROL DEVICE, AND METHOD FOR DISPLAYING AUTOMATIC DRIVING INFORMATION

TECHNICAL FIELD

The present invention relates to a vehicle information display control device, and particularly to a method for displaying automatic driving information.

BACKGROUND ART

For example, Patent Document 1 below discloses a technique for presenting levels of automation to a driver in switching a manual driving mode of a vehicle to an automatic driving mode stepwise to resolve the discomfort of the driver in the automatic driving mode.

PRIOR-ART DOCUMENTS

Patent Documents

Patent Document 1: Japanese Patent Application Laid-Open. No. 2015-24746

SUMMARY OF INVENTION

Problems to be Solved by the Invention

In Patent Document 1, the levels of automation to be presented to the driver are represented by numerical values such as 1, 2, and 3. Although the driver can roughly understand a degree (percentage) of the automation, the driver has difficulties in intuitively understanding, among actuators of the vehicle (for example, a steering, an accelerator, a brake, and a shifter), which one is automatically controlled and which one is manually controlled.

The present invention has been conceived to solve such a problem, and has an object of providing a vehicle information display control device that allows the driver to intuitively understand a control mode (an automatic control mode or a manual control mode) of each of the actuators.

Means to Solve the Problems

A vehicle information display control device according to a first aspect of the present invention includes: an automatic driving information obtaining unit to obtain automatic driving information including information indicating that each actuator of a vehicle is in a manual control mode or an automatic control mode; and a display controller to cause a display to display an image based on the automatic driving information, wherein the display controller causes the display to display an image of a manual driving device corresponding to each of the actuators and to display a manual-operation recalling image superimposed on the image of the manual driving device corresponding to one of the actuators that is in the manual control mode, the manual-operation recalling image being an image that recalls an operation performed by a person.

A vehicle information display control device according to a second aspect of the present invention includes: an automatic driving information obtaining unit to obtain automatic driving information including information indicating that each actuator of a vehicle is in a manual control mode or an automatic control mode; and a display controller to cause a display to display an image based on the automatic driving information, wherein the display controller causes the display to display an image of a manual driving device corresponding to each of the actuators and to display an automatic-operation recalling image superimposed on the image of the manual driving device corresponding to one of the actuators that is in the automatic control mode.

Effects of the Invention

Since the driving assistance system according to the present invention displays, according to a control mode of each of the actuators, a manual-operation recalling image or an automatic-operation recalling image that is superimposed on an image of each of manual driving devices corresponding to the actuators, the driver can intuitively understand the control mode of the actuator from the display.

The object, features, aspects and advantages of this invention will become more apparent from the following detailed description and the accompanying drawings.

BRIEF DESCRIPTION OF DRAWINGS

FIGS. 27A and 27B illustrate a display example of a distance or a time up to an automatic-driving allowed section.

FIGS. 28A and 28B illustrate a display example of the distance or the time up to the automatic-driving allowed section.

DESCRIPTION OF EMBODIMENTS

Embodiment 1

Figure 1:
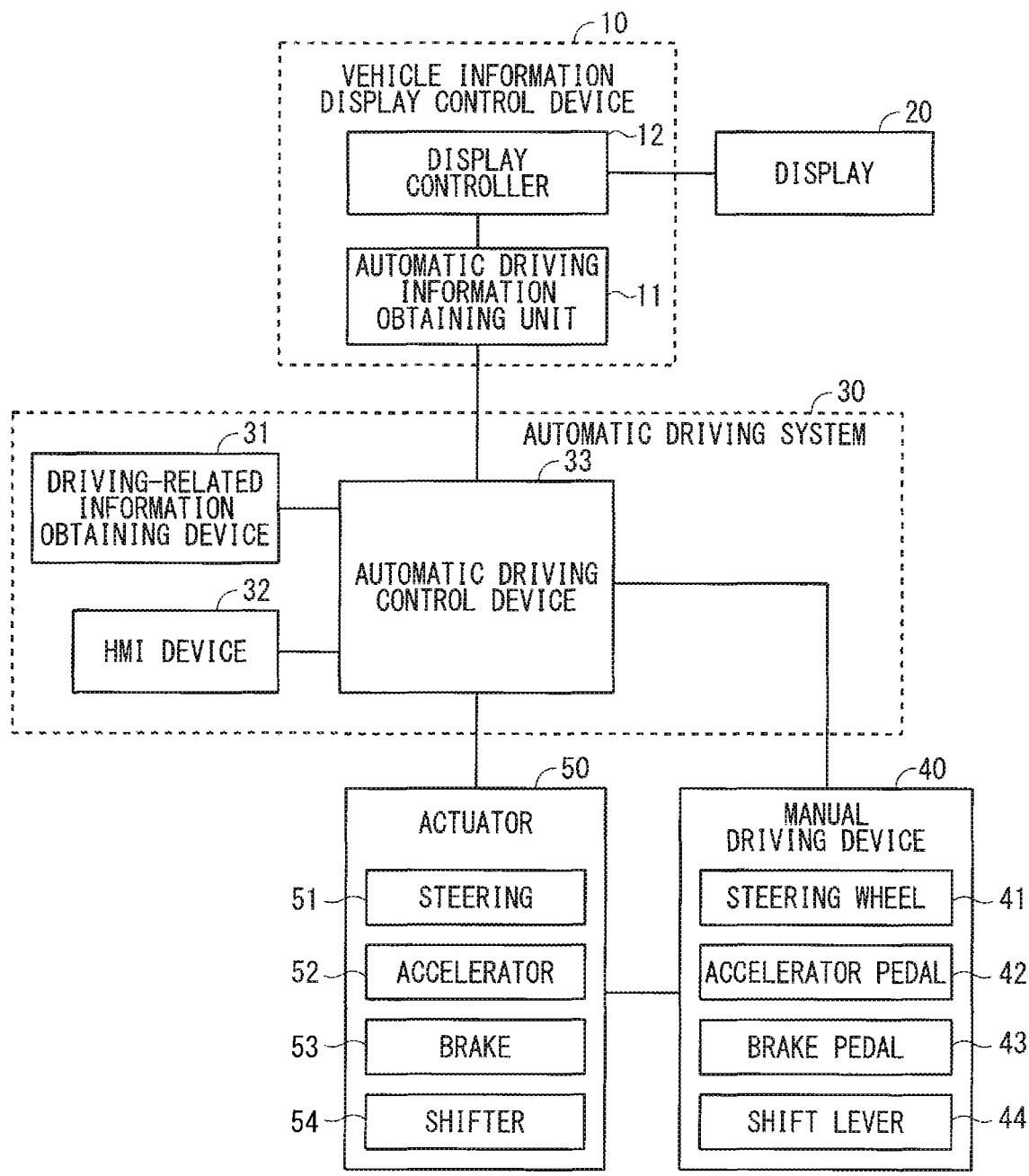
FIG. 1 is a block diagram illustrating a configuration of a driving assistance system according to an embodiment of the present invention.

FIG. 1 is a block diagram illustrating a configuration of a driving assistance system according to Embodiment 1 of the present invention. As illustrated in FIG. 1, the driving assistance system includes a vehicle information display control device 10, a display 20, an automatic driving system 30, a manual driving device 40, and an actuator 50. Hereinafter, a vehicle equipped with the driving assistance system will be referred to as a "subject vehicle".

The actuator 50 is a device for controlling traveling of the subject vehicle, and includes a plurality of elements such as a steering 51, an accelerator 52 (throttle), a brake 53, and a shifter 54 (gear) (each of these elements may be referred to as an "actuator"). Besides, the actuator 50 may include lighting devices such as a head lamp and a blinker.

The manual driving device 40 is a device allowing the driver to control the actuator 50 through a manual operation, and includes a steering wheel 41 for operating the steering 51, an accelerator pedal 42 for operating the accelerator 52, a brake pedal 43 for operating the brake 53, and a shift lever 44 for operating the shifter 54 (each of these elements may be referred to as a "manual driving device"). Besides, the manual driving device 40 may include operation devices for the lighting devices.

The automatic driving system 30 is a system for automatically controlling the actuator 50, and includes a driving-related information obtaining device 31, a Human-Machine Interface (HMI) device 32, and an automatic driving control device 33.

The driving-related information obtaining device 31 includes various sensors and a communication device, and obtains various pieces of information related to the driving of the subject vehicle (driving-related information). Examples of the driving-related information include information on obstructions around the subject vehicle (for example, pedestrians, the other vehicles, and features), map information, information on the current position of the subject vehicle, information on a planned travel route of the subject vehicle, traffic information (for example, traffic jam information and construction information), and information indicating a state of the driver (for example, an arousal level, a gaze point, and a limb position).

The HMI device 32 is a user interface for the driver of the subject vehicle to input an instruction to the automatic driving control device 33, and for the automatic driving control device 33 to present the various pieces of information to the driver. Input means of the HMI device 32 may be pieces of hardware such as an operation button, a keyboard, and a remote control switch, or a software key using a button (icon) displayed on a screen. Means for outputting information include a display and an audio output device. When a software key functioning as the input means is displayed on a display functioning as the output means, the HMI device 32 may be configured as a touch panel.

The automatic driving control device 33 automatically controls the actuator 50 based on the driving-related information obtained by the driving-related information obtaining device 31 and the instruction of the driver input to the HMI device 32.

Hereinafter, a control mode in which the automatic driving system 30 (the automatic driving control device 33) automatically controls the actuator 50 will be referred to as an "automatic control mode", and a control mode in which the actuator 50 is controlled by a manual operation of the driver using the manual driving device 40 will be referred to as a "manual control mode". Each of the elements of the actuator 50 is set to a control mode. For example, only the steering 51 may be set to the automatic control mode, whereas the accelerator 52, the brake 53, and the shifter 54 may be set to the manual control mode.

The vehicle information display control device 10 includes an automatic driving information obtaining unit 11 and a display controller 12. The automatic driving information obtaining unit 11 obtains automatic driving information from the automatic driving control device 33. The automatic driving information includes information at least indicating that each of the actuators (the steering 51, the accelerator 52, the brake 53, and the shifter 54) of the subject vehicle is in the manual control mode or the automatic control mode. The display controller 12 causes the display 20 to display an image based on the automatic driving information obtained by the automatic driving information obtaining unit 11.

According to Embodiment 1, the display controller 12 causes the display 20 to display images of the manual driving devices (the steering wheel 41, the accelerator pedal 42, the brake pedal 43, and the shift lever 44) corresponding to the respective actuators and also to display a manual-operation recalling image superimposed on, among the images, each of the images corresponding to the actuators in the manual control mode. The manual-operation recalling image is an image that recalls an operation performed by a person. Examples of the manual-operation recalling image include images of a human hand, a human foot, a human handprint, a human footprint, a human handwear, and a human footwear.

The display 20 is preferably placed in a meter cluster of the driver's seat, but is not limited to such. The display 20 may be disposed, for example, in a center panel of a dash board (between the driver's seat and the front passenger seat), or implemented as a head up display (HUD). The HUD displays an image on a windshield of a vehicle, so that the image appears as a virtual image in the driver's vision. The driver views the image (virtual image) displayed by the HUD as if it was in the space ahead of the vehicle.

Figure 2:
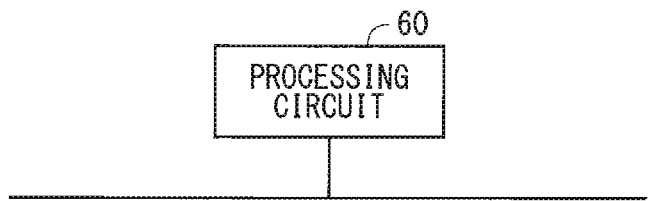
FIG. 2 illustrates an example hardware configuration of a vehicle information display control device.
Figure 3:
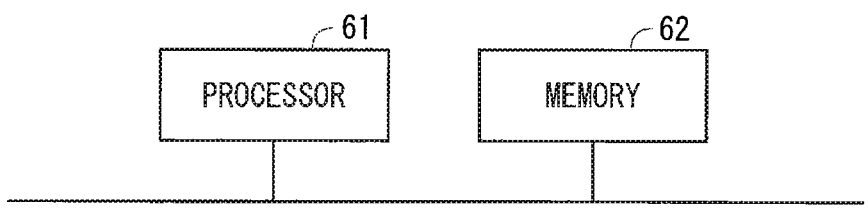
FIG. 3 illustrates an example hardware configuration of the vehicle information display control device.

FIGS. 2 and 3 each illustrate an example hardware configuration of the vehicle information display control device 10. The automatic driving information obtaining unit 11 and the display controller 12 of the vehicle information display control device 10 can be implemented by, for example, a processing circuit 60 illustrated in FIG. 2. In other words, the processing circuit 60 includes the automatic driving information obtaining unit 11 that obtains automatic driving information from the automatic driving system 30, and the display controller 12 that displays an image on the display 20 based on the automatic driving information. This processing circuit 60 may be dedicated hardware, or a processor (a central processing unit, a CPU, a processing unit, an arithmetic unit, a microprocessor, a microcomputer, or a digital signal processor) that executes a program stored in a memory.

When the processing circuit 60 is dedicated hardware, examples of the processing circuit 60 include a single circuit, a composite circuit, a programmed processor, a parallel-programmed processor, an ASIC, a FPGA, and any combination of these. Each of the functions of the automatic driving information obtaining unit 11 and the display controller 12 may be implemented by a plurality of the processing circuits 60 or by the one processing circuit 60 collectively.

FIG. 3 illustrates a hardware configuration of the vehicle information display control device 10 when a processor is configured as the processing circuit 60. The functions of the automatic driving information obtaining unit 11 and the display controller 12 are implemented by any combinations with software (software, firmware, or the software and the firmware). For example, the software is described as a program, and stored in a memory 62. A processor 61 functioning as the processing circuit 60 implements the functions of each of the unit and the controller by reading and executing the program stored in the memory 62. In other words, the vehicle information display control device 10 includes the memory 62 for storing a program which, when executed by the processing circuit 60, consequently executes the steps of: obtaining automatic driving information from the automatic driving system 30; and displaying an image on the display 20 based on the automatic driving information. Put it differently, this program causes a computer to execute procedures or methods of the automatic driving information obtaining unit 11 and the display controller 12.

Here, examples of the memory 62 include: non-volatile or volatile semiconductor memories such as a random access memory (RAM), a read only memory (ROM), a flash memory, an erasable programmable read only memory (EPROM), and an electrically erasable programmable read only memory (EEPROM); and a hard disk drive (HDD), a magnetic disk, a flexible disk, an optical disk, a compact disk, a mini disk, and a digital versatile disc (DVD) and their drive devices.

The configuration for implementing each of the functions of the automatic driving information obtaining unit 11 and the display controller 12 by, for example, one of software and hardware is described above. The configuration is not limited to such, but part of the automatic driving information obtaining unit 11 and the display controller 12 may be implemented by dedicated hardware or another part thereof may be implemented by, for example, software. For example, a processing circuit that is dedicated hardware can implement the functions of the automatic driving information obtaining unit 11, whereas the processing circuit 60 functioning as the processor 61 can implement the functions of the display controller 12 by reading and executing the program stored in the memory 62.

As described above, the processing circuit 60 can implement each of the functions above using hardware, software, or a combination of these.

Figure 4:
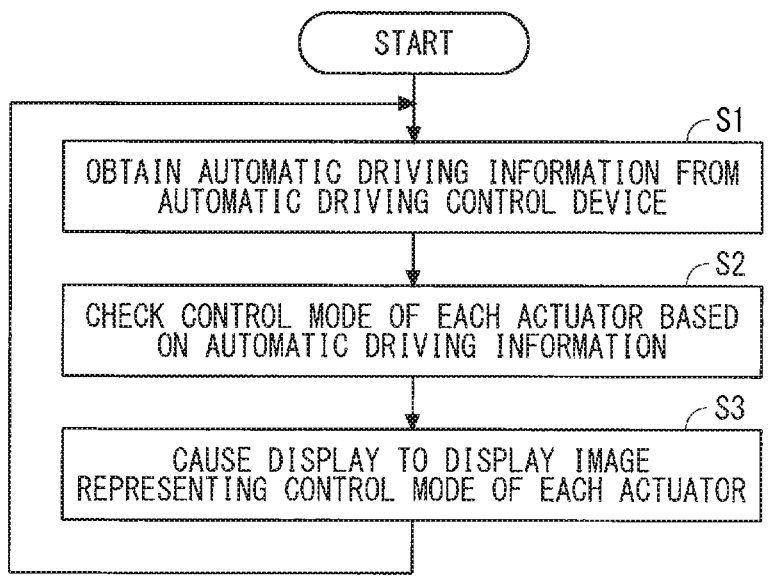
FIG. 4 is a flowchart indicating operations of the vehicle information display control device.

Next, operations of the vehicle information display control device 10 according to Embodiment 1 will be described by giving specific display examples of the automatic driving information. FIG. 4 is a flowchart indicating the operations of the vehicle information display control device 10.

Upon start of the vehicle information display control device 10, the automatic driving information obtaining unit 11 obtains, from the automatic driving control device 33, the automatic driving information including information on a control mode (the manual control mode or the automatic control mode) of each of the actuators (Step S1). The display controller 12 checks the control mode of each of the actuators based on the automatic driving information obtained by the automatic driving information obtaining unit 11 (Step S2). Then, the display controller 12 causes the display 20 to display an image representing the control mode of each of the actuators (Step S3). The vehicle information display control device 10 repeats this series of operations.

In Step S3, the display controller 12 causes the display 20 to display images of the manual driving devices (the steering wheel 41, the accelerator pedal 42, the brake pedal 43, and the shift lever 44) corresponding to the respective actuators and also to display a manual-operation recalling image superimposed on, among the images, each of images corresponding to the actuators in the manual control mode. The manual-operation recalling image is an image that recalls an operation performed by a person.

Figure 5:
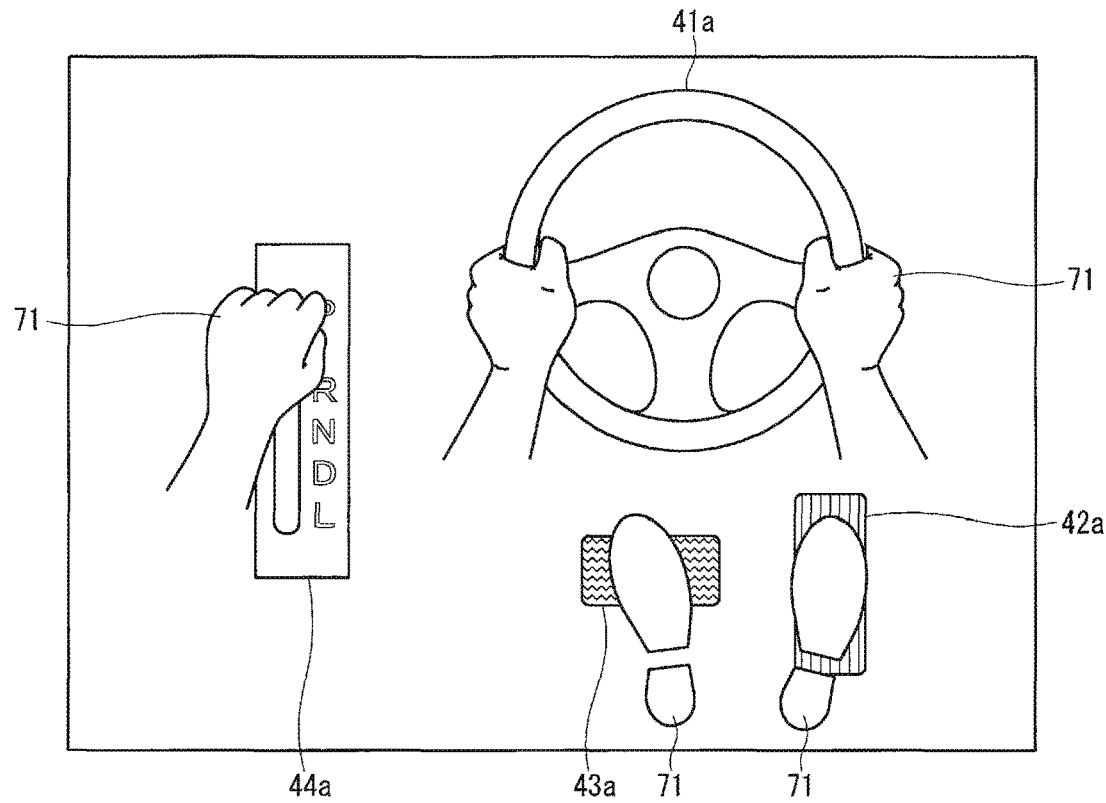
FIG. 5 illustrates a display example of automatic driving information.

For example, when all of the steering 51, the accelerator 52, the brake 53, and the shifter 54 are in the manual control mode, the display controller 12 causes the display 20 to display a steering wheel image 41a representing the steering wheel 41, an accelerator pedal image 42a representing the accelerator pedal 42, a brake pedal image 43a representing the brake pedal 43, and a shift lever image 44a representing the shift lever 44 and also to display manual-operation recalling images 71 superimposed on these images as illustrated in FIG. 5. Normally, the steering wheel 41 and the shift lever 44 are hand-operated, and the accelerator pedal 42 and the brake pedal 43 are foot-operated. According to Embodiment 1, the manual-operation recalling images 71 to be superimposed on the steering wheel image 41a and the shift lever image 44a are images of the human hands, and the manual-operation recalling images 71 to be superimposed on the accelerator pedal image 42a and the brake pedal image 43a are images of the human footprints (shoe-sole shape images). Obviously, the steering wheel image 41a is an image corresponding to the steering 51, the accelerator pedal image 42a is an image corresponding to the accelerator 52, the brake pedal image 43a is an image corresponding to the brake 53, and the shift lever image 44a is an image corresponding to the shifter 54.

Figure 6:
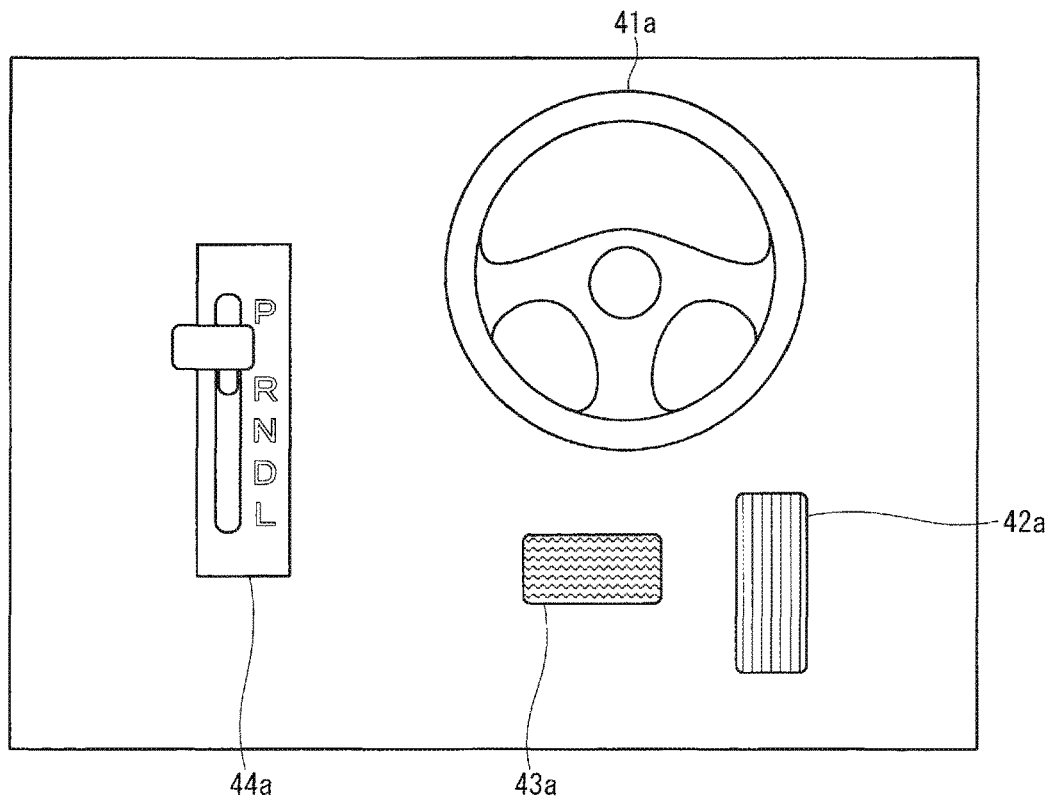
FIG. 6 illustrates a display example of the automatic driving information.
Figure 7:
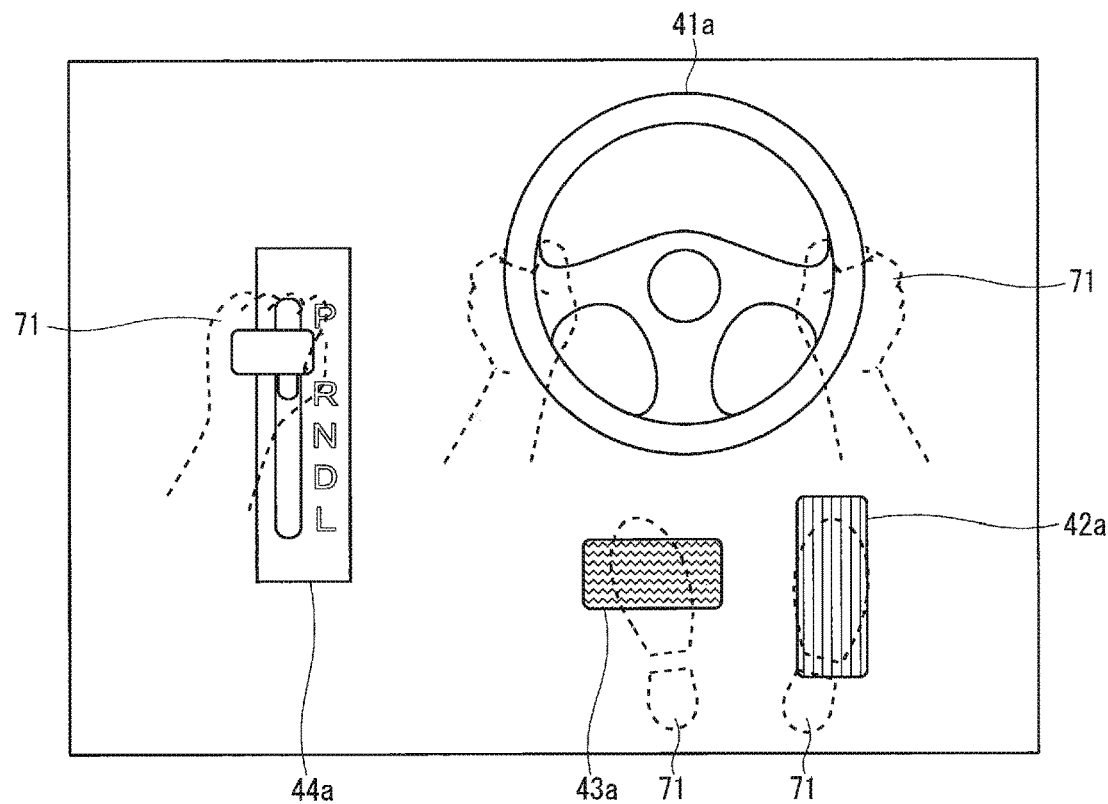
FIG. 7 illustrates a display example of the automatic driving information.

When all of the steering 51, the accelerator 52, the brake 53, and the shifter 54 are in the automatic control mode, the display controller 12 causes the display 20 to display not the manual-operation recalling images 71 but the steering wheel image 41a, the accelerator pedal image 42a, the brake pedal image 43a, and the shift lever image 44a as illustrated in FIG. 6. Alternatively, the manual-operation recalling image 71 displayed translucently or with a broken line may be superimposed and displayed on each of the steering wheel image 41a, the accelerator pedal image 42a, the brake pedal image 43a, and the shift lever image 44a as illustrated in FIG. 7.

Figure 8:
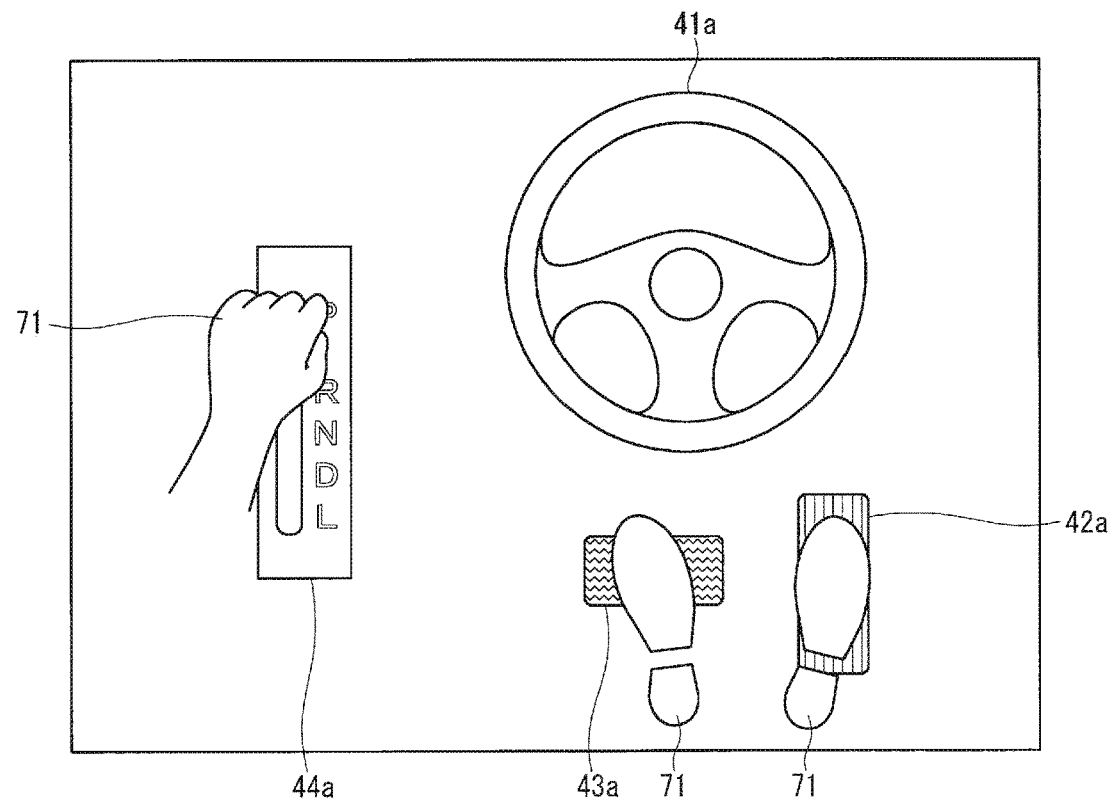
FIG. 8 illustrates a display example of the automatic driving information.

When there is a mix of the actuators in the manual control mode and the actuators in the automatic control mode, the display controller 12 displays the manual-operation recalling images 71 superimposed only on images corresponding to the actuators in the manual control mode. For example, when only the steering 51 is in the automatic control mode and the accelerator 52, the brake 53, and the shifter 54 are in the manual control mode, the display controller 12 displays the manual-operation recalling image 71 superimposed not on the steering wheel image 41a but on each of the accelerator pedal image 42a, the brake pedal image 43a, and the shift lever image 44a as illustrated in FIG. 8.

Figure 9:
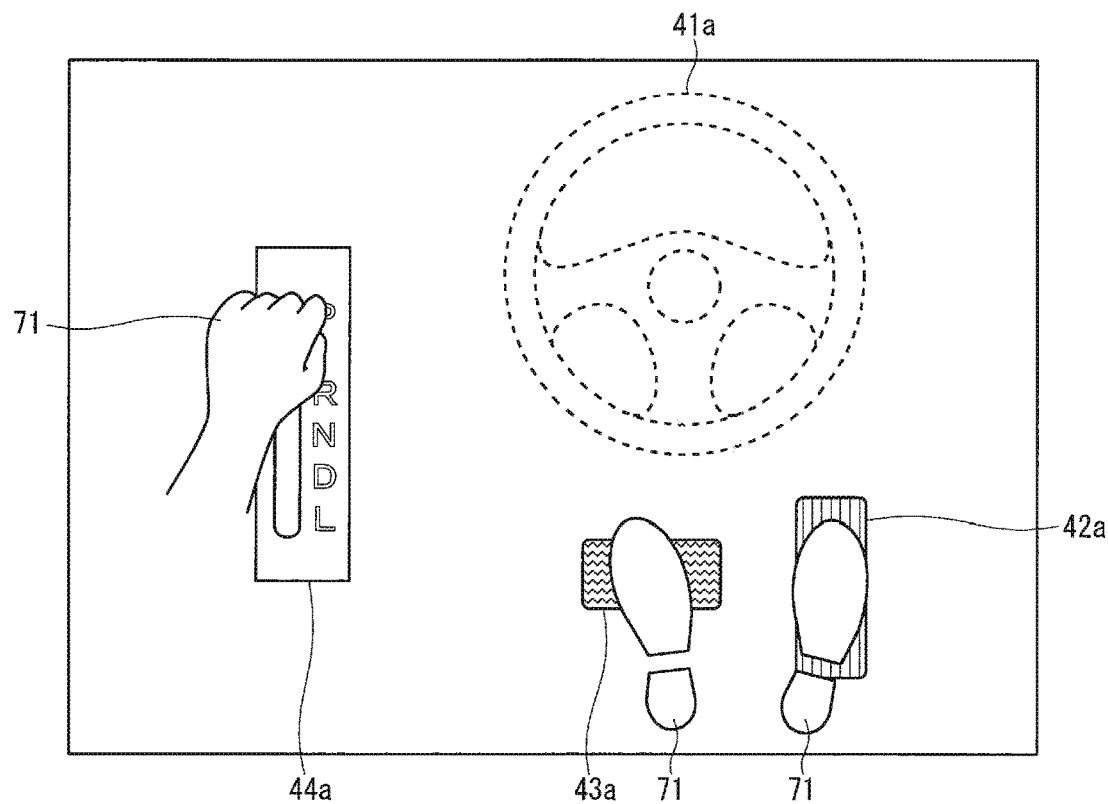
FIG. 9 illustrates a display example of the automatic driving information.

The image of the manual driving device corresponding to the actuator in the manual control mode and the image of the manual driving device corresponding to the actuator in the automatic control mode may have different display modes. For example, the image of the manual driving device corresponding to the actuator in the automatic control mode (the steering wheel image 41a herein) may be displayed translucently or with a broken line as illustrated in FIG. 9. The image of the manual driving device corresponding to the actuator in the manual control mode may be a planar image, whereas the image of the manual driving device corresponding to the actuator in the automatic control mode may be a stereoscopic image. The image of the manual driving device corresponding to the actuator in the manual control mode and the image of the manual driving device corresponding to the actuator in the automatic control mode may have different colors, lightness, and sizes, etc. The animation effects (for example, blinking and changing the color) may be applied to only one of the image of the manual driving device corresponding to the actuator in the manual control mode and the image of the manual driving device corresponding to the actuator in the automatic control mode. Furthermore, textual information may be added to the images for display.

Figure 10:
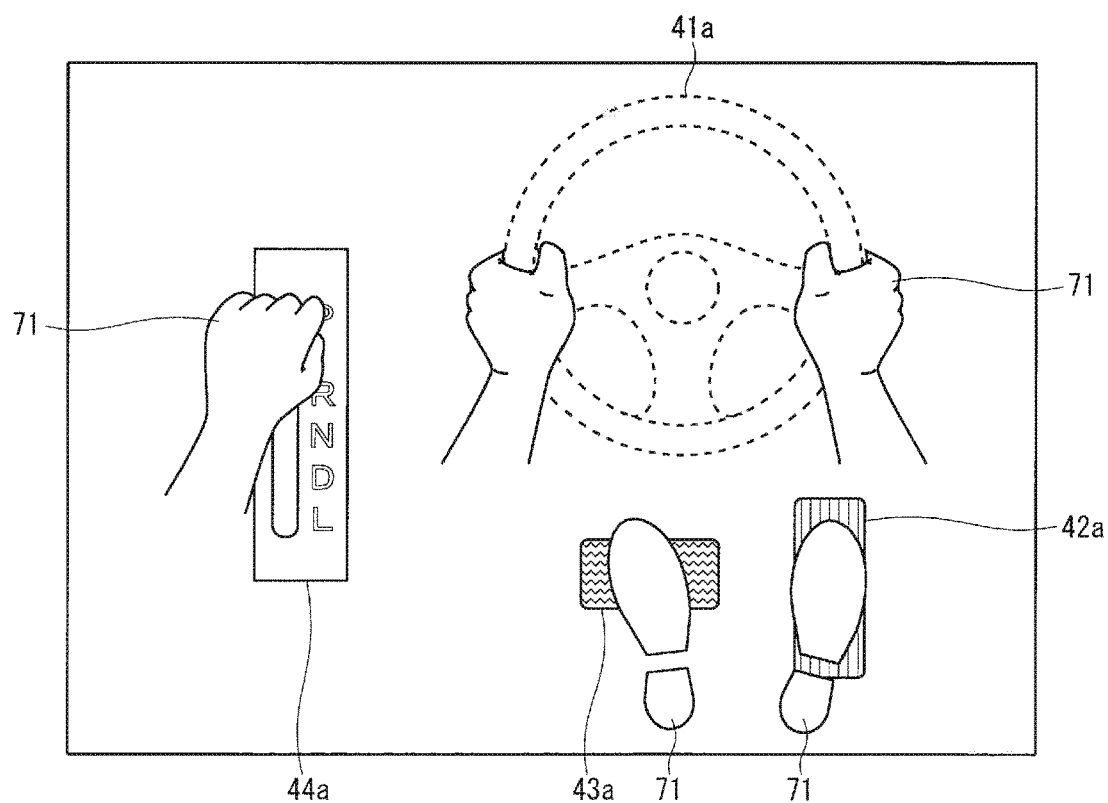
FIG. 10 illustrates a display example of the automatic driving information.

Here, the automatic control mode may have two types, one not allowing any intervention with a manual operation and the other switching to the manual control mode upon a manual operation. The automatic control mode may be distinguished between the two types. For example, when the steering 51 is in the automatic control mode of not allowing any intervention with a manual operation, the steering wheel image 41a may be displayed translucently or with a broken line as illustrated in FIG. 9. When the steering 51 is in the automatic control mode of switching to the manual control mode upon a manual operation, the manual-operation recalling image 71 may be superimposed and displayed on the steering wheel image 41a displayed translucently or with a broken line as illustrated in FIG. 10.

Figure 11:
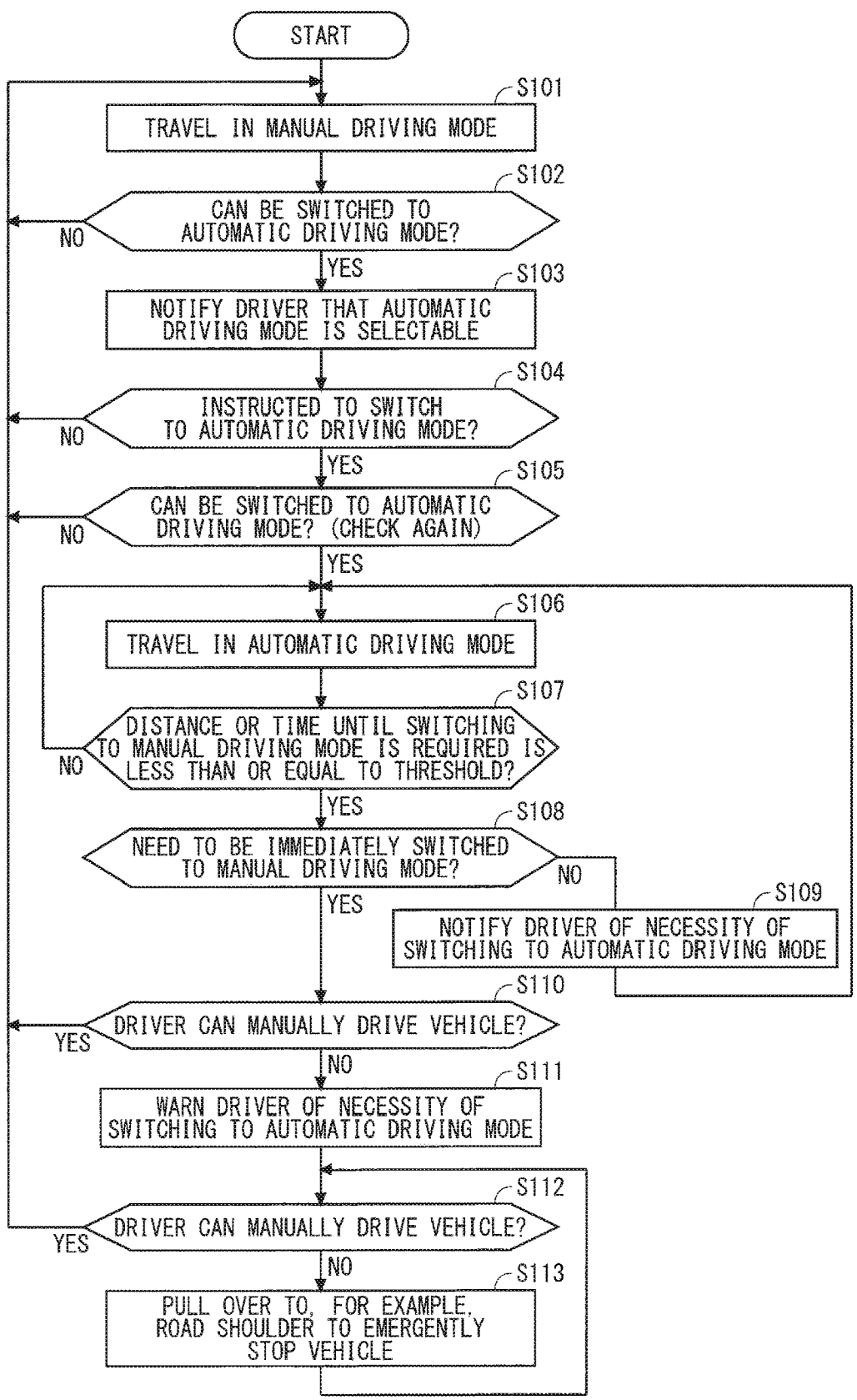
FIG. 11 is a flowchart indicating operations of an automatic driving system.

Hereinafter, a specific example of interworking between the vehicle information display control device 10 and the automatic driving system 30 in the driving assistance system according to Embodiment 1 will be described. FIG. 11 is a flowchart indicating operations of the automatic driving system 30. The flows in FIG. 11 indicate an example of the operations of the automatic driving system 30, and do not limit the application of the present invention. For the sake of simplicity, the operation modes of the subject vehicle defined in the automatic driving system 30 are assumed to be only two types: the manual driving mode in which all the elements of the actuator 50 operate in the manual control mode and the automatic driving mode in which all the elements of the actuator 50 operate in the automatic control mode.

The automatic driving information obtained by the automatic driving information obtaining unit 11 from the automatic driving control device 33 includes, besides the information indicating that each of the actuators of the subject vehicle is in the manual control mode or the automatic control mode, information indicating that the actuators in the manual control mode can be switched to the automatic control mode, information on a distance or a time until the actuators in the automatic control mode need to be switched to the manual control mode, and information on a distance or a time until the actuators in the manual control mode can be switched to the automatic control mode.

Figure 12:
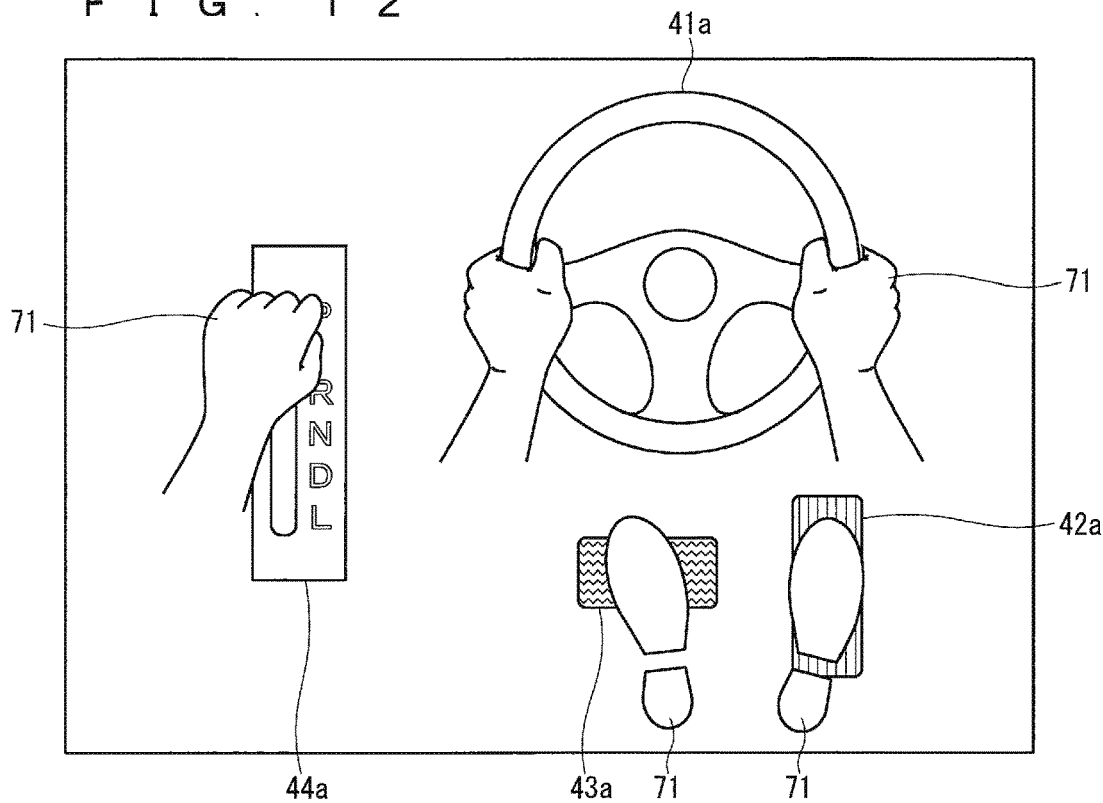
FIG. 12 illustrates a display example of the automatic driving information.

Immediately after the automatic driving system 30 is started, the automatic driving control device 33 sets the subject vehicle to the manual driving mode (Step S101). Since the actuator 50 is in the manual control mode, the display controller 12 of the vehicle information display control device 10 displays the manual-operation recalling image 71 superimposed on each of the steering wheel image 41a, the accelerator pedal image 42a, the brake pedal image 43a, and the shift lever image 44a as illustrated in FIG. 12.

While the subject vehicle is traveling in the manual driving mode, the automatic driving control device 33 checks whether the subject vehicle can be switched to the automatic driving mode, based on the driving-related information obtained by the driving-related information obtaining device 31 (Step S102). For example, when the automatic driving mode is permitted on a motorway such as a highway, the automatic driving control device 33 checks a road on which the subject vehicle is traveling, using the map information and the information on the current position of the subject vehicle, and determines that the subject vehicle can be switched to the automatic driving mode when the subject vehicle is traveling the motorway.

Figure 13:
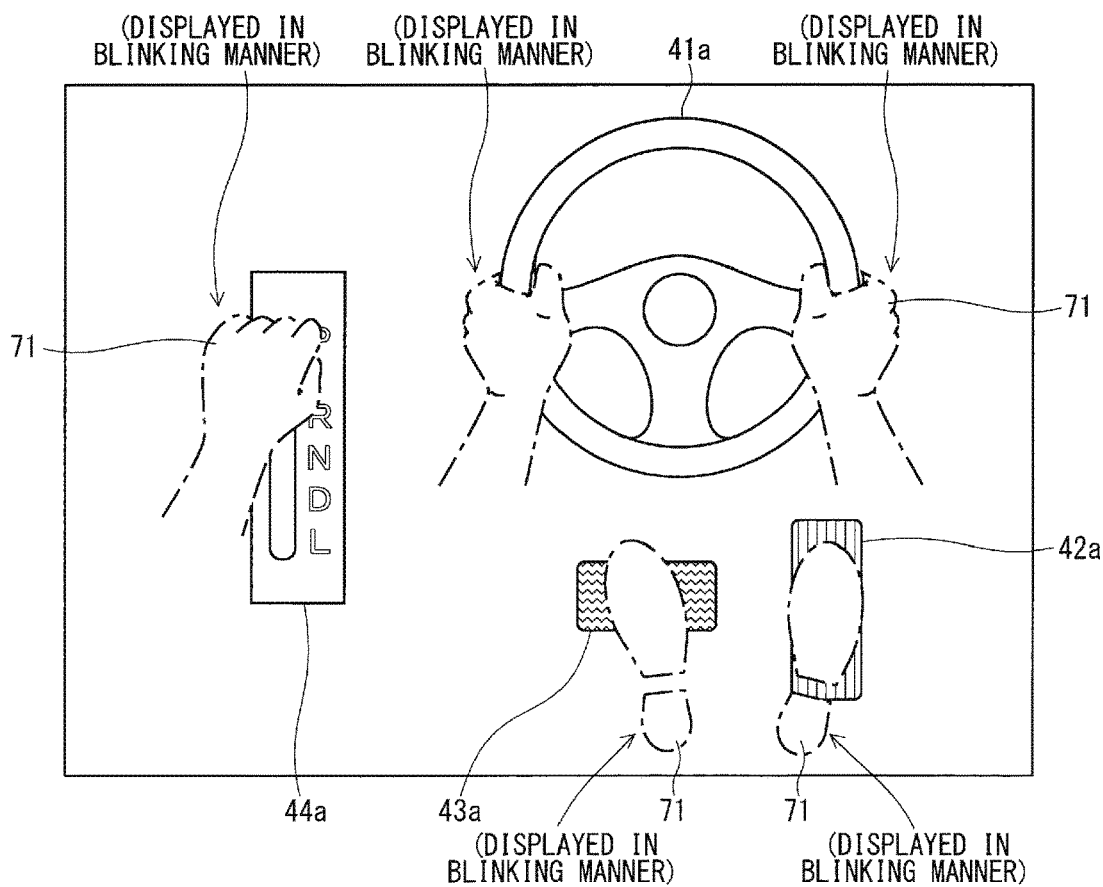
FIG. 13 illustrates a display example of the automatic driving information.

When the subject vehicle can be switched to the automatic driving mode (YES in Step S102), the automatic driving control device 33 notifies the driver of it through the HMI device 32 (Step S103). Here, the display controller 12 detects the notification by the automatic driving system 30 in Step S103 based on the automatic driving information, and performs the notification using the display 20. Examples of the conceivable notification method include blinking the manual-operation recalling images 71 as illustrated in FIG. 13. After the notification, the driver can instruct the automatic driving control device 33 to switch to the automatic driving mode by operating the HMI device 32.

Upon receipt of the instruction for switching to the automatic driving mode (YES in Step S104), the automatic driving control device 33 checks again that the subject vehicle can be switched to the automatic driving mode (Step S105), and switches the subject vehicle to the automatic driving mode (Step S106). Without any instruction for switching to the automatic driving mode (NO in Step S104) or when the subject vehicle cannot be switched to the automatic driving mode even with the instruction (NO in Step S105), the processes are returned to Step S101, and the manual driving mode is continued.

Figure 14:
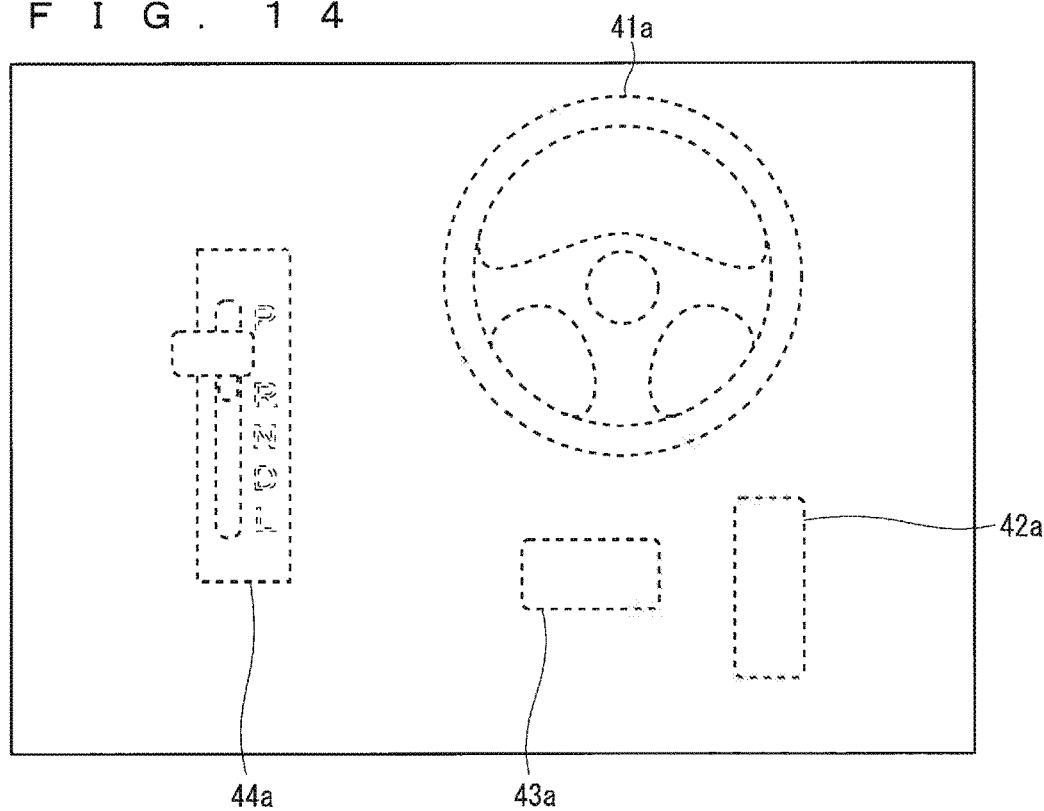
FIG. 14 illustrates a display example of the automatic driving information.

Since the actuator 50 is in the automatic control mode with the subject vehicle set to the automatic driving mode, the display controller 12 of the vehicle information display control device 10 deletes the displayed manual-operation recalling images 71 from the display 20, and further displays the steering wheel image 41a, the accelerator pedal image 42a, the brake pedal image 43a, and the shift lever image 44a translucently or with dotted lines as illustrated in FIG. 14.

While the subject vehicle is traveling in the automatic driving mode, the automatic driving control device 33 checks whether a distance or a time until switching to the manual driving mode is required is less than or equal to a predetermined threshold, based on the driving-related information obtained by the driving-related information obtaining device 31 (Step S107). For example, when the automatic driving mode is not permitted except on a motorway, the automatic driving control device 33 calculates a distance or a time until the subject vehicle gets off the motorway, using the map information, the information on the current position of the subject vehicle, and the information on the planned travel route of the subject vehicle, and compares the value with the threshold. It is preferred that the threshold is, for example, 5 km in distance or approximately 5 minutes in time. When the distance or the time until switching to the manual driving mode is required is more than the threshold (NO in Step S107), the processes are returned to Step S106, and the automatic driving mode is continued.

When the distance or the time until switching to the manual driving mode is required is less than or equal to the threshold (YES in Step S107), the automatic driving control device 33 further checks whether the subject vehicle needs to be immediately switched to the manual driving mode (Step S108). The automatic driving control device 33 checks it by comparing the distance or the time until switching to the manual driving mode is required with a second threshold smaller than the threshold in Step S107. Although the second threshold may be 0, it may be 1 km in distance or 1 minute in time with a margin given.

Figure 15:
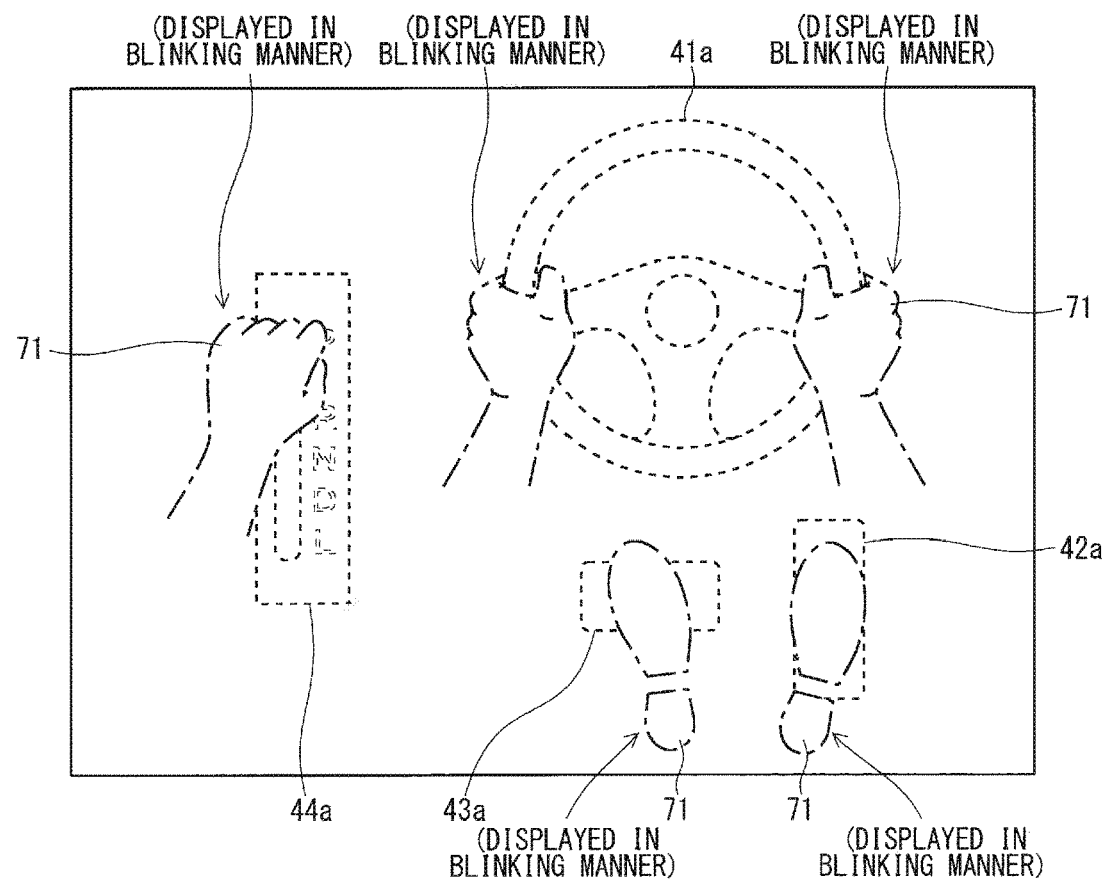
FIG. 15 illustrates a display example of the automatic driving information.

When the subject vehicle need not be immediately switched to the manual driving mode (NO in Step S108), the automatic driving control device 33 notifies the driver of the necessity of switching to the automatic driving mode through the HMI device 32 (Step S109), and continues the automatic driving mode. Here, the display controller 12 detects the notification by the automatic driving system 30 in Step S109 based on the automatic driving information, and performs the notification using the display 20. Examples of the conceivable notification method include superimposing the manual-operation recalling images 71 on the display of FIG. 14 and displaying the manual-operation recalling images 71 in a blinking manner as illustrated in FIG. 15.

The driver can return the subject vehicle to the manual driving mode (Step S101) by operating the HMI device 32 with any timing when the subject vehicle is in the automatic driving mode, although its illustration is omitted in FIG. 11. Normally, the driver will voluntarily switch the subject vehicle to the manual driving mode upon receipt of the notification in Step S109.

However, if the subject vehicle still continues to travel in the automatic driving mode, the subject vehicle needs to be immediately switched to the manual driving mode (YES in Step S108). Here, the automatic driving control device 33 determines whether the driver can manually drive the subject vehicle (Step S110). The automatic driving control device 33 makes this determination based on, for example, the line of sight, the arousal level, and the limb position of the driver (whether the manual driving device 40 is being operated). When the driver can manually drive the subject vehicle (YES in Step S110), the processes are returned to Step S101, and the automatic driving control device 33 switches the subject vehicle to the manual driving mode.

Figure 16:
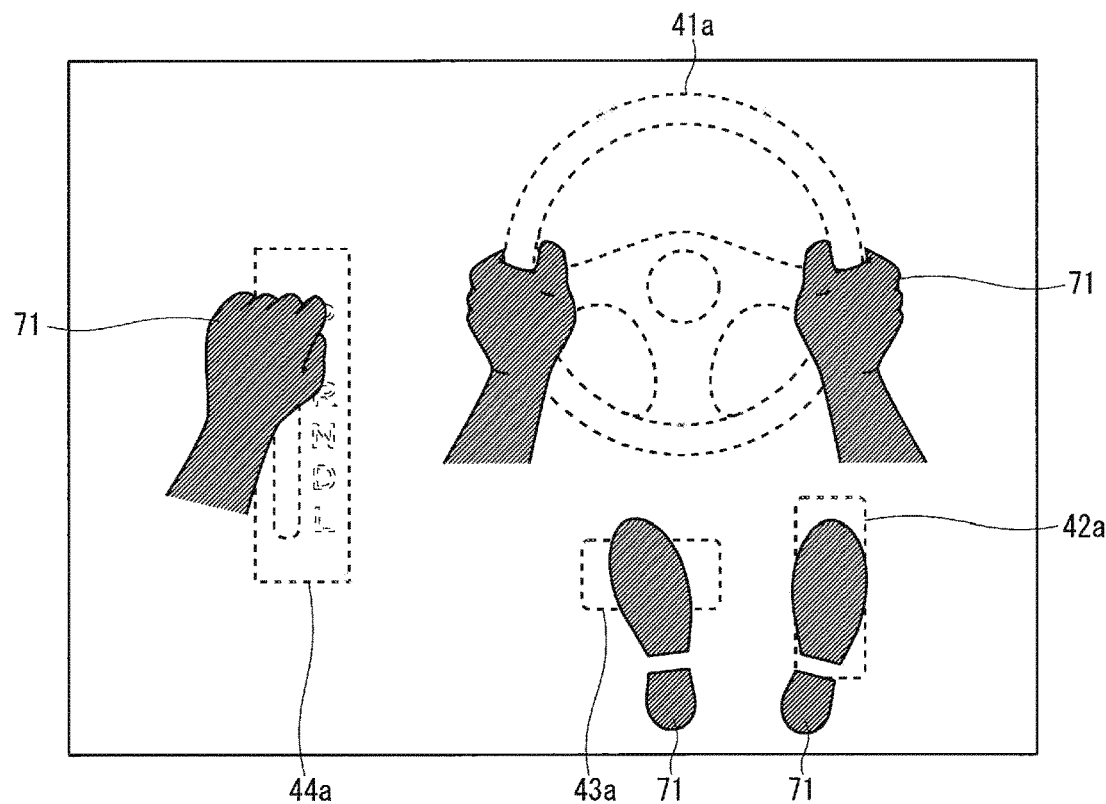
FIG. 16 illustrates a display example of the automatic driving information.

However, when the driver cannot manually drive the subject vehicle (NO in Step S110), the automatic driving control device 33 warns the driver of the necessity of switching to the automatic driving mode (Step S111). Here, the display controller 12 detects the warning by the automatic driving system 30 in Step S111 based on the automatic driving information, and performs the warning using the display 20. Examples of the conceivable warning method include changing the color of the manual-operation recalling images 71 from the state illustrated in FIG. 15 into a more prominent color as illustrated in FIG. 16.

After the warning in Step S111, the automatic driving control device 33 checks again whether the driver can manually drive the subject vehicle using the manual driving device 40 (Step S112). When the driver can manually drive the subject vehicle (YES in Step S112), the processes are returned to Step S101, and the automatic driving control device 33 switches the subject vehicle to the manual driving mode.

However, when the driver cannot manually drive the subject vehicle (NO in Step S112), the automatic driving control device 33 pulls over to, for example, a road shoulder to emergently stop the subject vehicle (Step S113), returns to Step S112, and waits until the driver can manually drive the subject vehicle.

Since the driving assistance system according to Embodiment 1 displays the manual-operation recalling image 71 superimposed on each of the images of the manual driving devices (the steering wheel image 41a, the accelerator pedal image 42a, the brake pedal image 43a, and the shift lever image 44a) corresponding to the actuators in the manual control mode, the driver can intuitively understand the control mode of each of the actuators from the display.

The screens that the display controller 12 causes the display 20 to display upon the notification in Step S103 and Step S109 and the warning in Step S111 are not limited to the examples in FIG. 13, FIG. 15, and FIG. 16, respectively, but may be in any modes. In other words, the display mode of the image of the manual driving device corresponding to each of the actuators may be explicitly changed from the normal condition. The methods of changing the image include changing the size, the shape, the movement, and the display position (including the virtual image distance) of the image, other than blinking the image and changing the color of the image.

Figure 17:
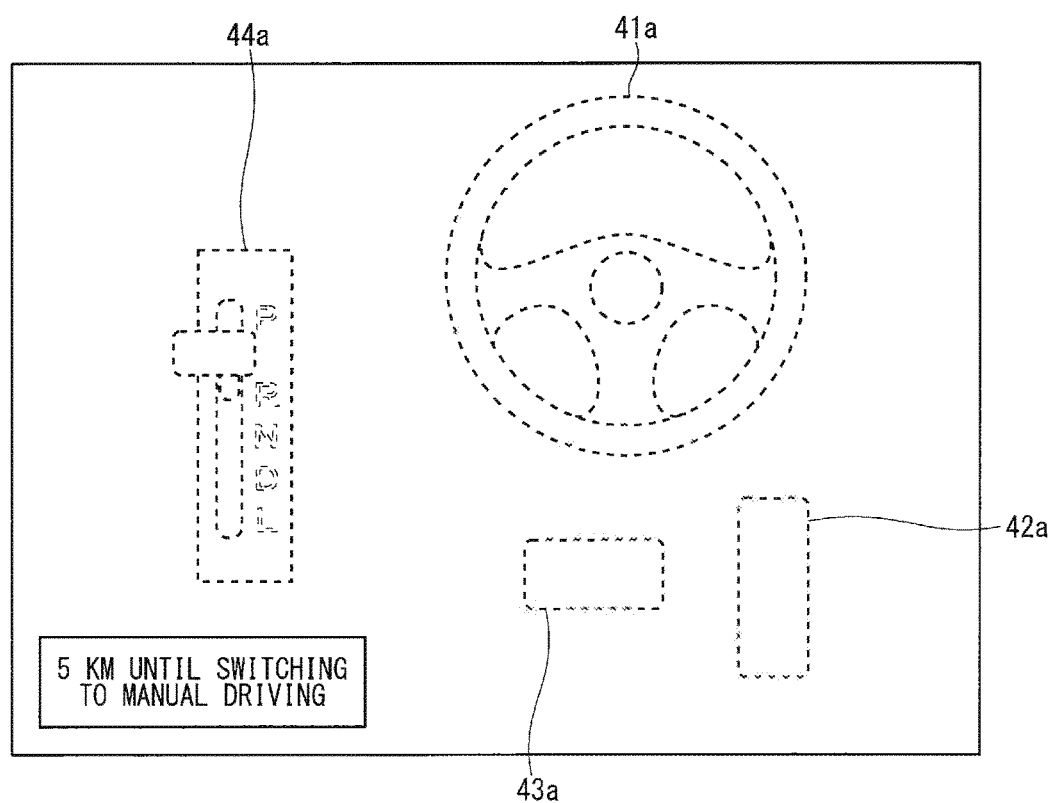
FIG. 17 illustrates a display example of the automatic driving information.
Figure 18:
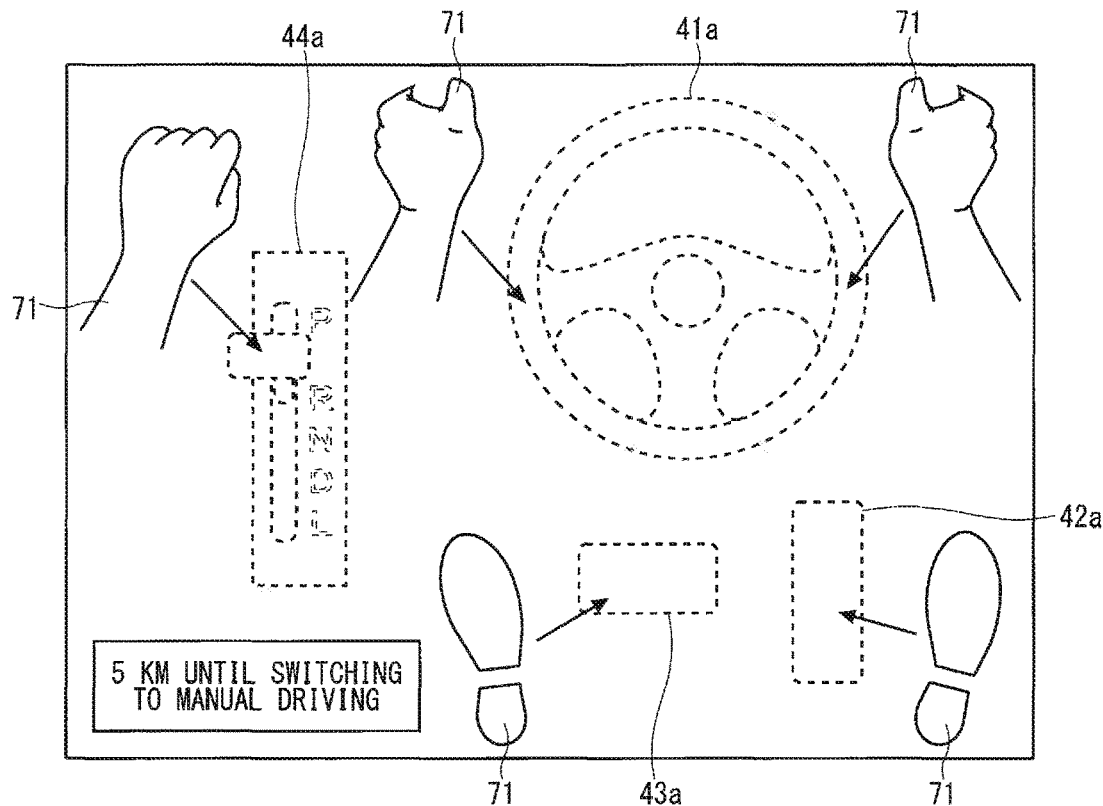
FIG. 18 illustrates a display example of the automatic driving information.

As illustrated in FIG. 17, a distance or a time until switching to the manual driving mode is required may be displayed, for example, in the notification in Step S109. As illustrated in FIG. 18, the manual-operation recalling image 71 may be displayed with a spacing from each of the images of the manual driving devices corresponding to the actuators in the automatic control mode, and a distance or a time until switching the actuators to the manual control mode is required may be represented by the size of the spacing (i.e., the shorter the distance or the time is, the closer the manual-operation recalling image 71 is brought to the image of the manual driving device).

Figure 19:
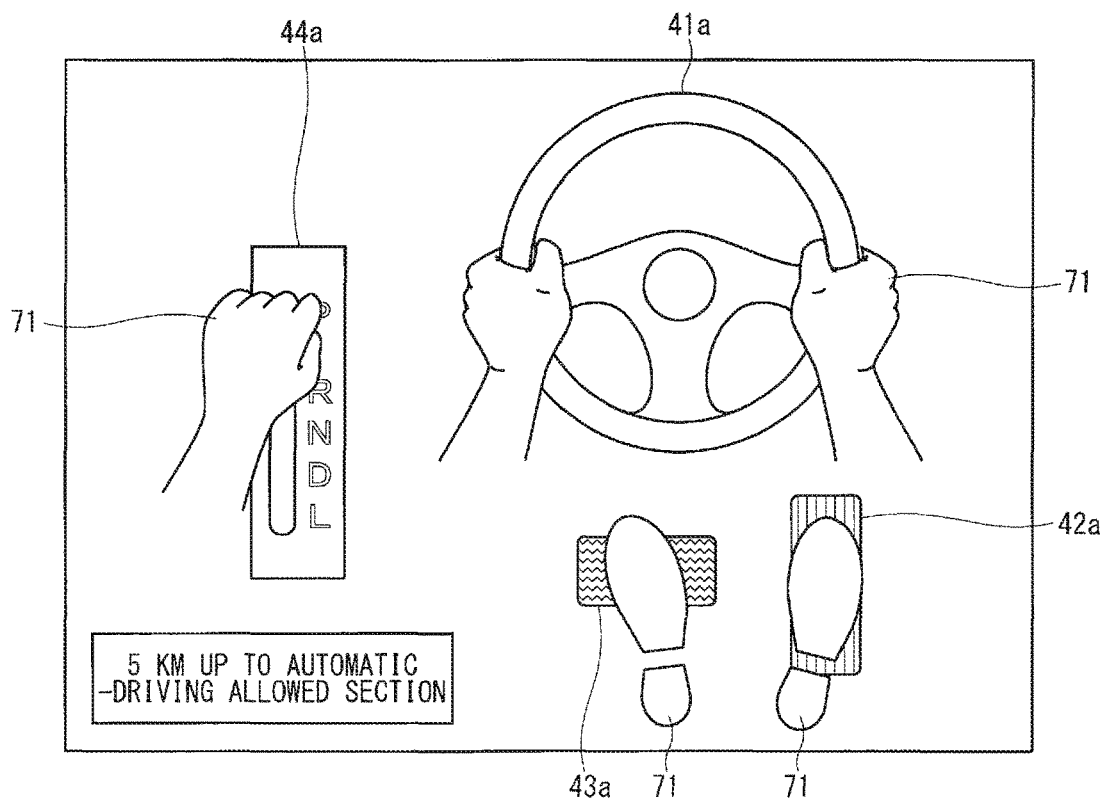
FIG. 19 illustrates a display example of the automatic driving information.

Prior to the notification in Step S103, the display controller 12 may cause the display 20 to display a notification of a distance or a time until the subject vehicle reaches a section at which the subject vehicle can be switched to the automatic driving mode (for example, a motorway) as illustrated in FIG. 19.

Figure 20:
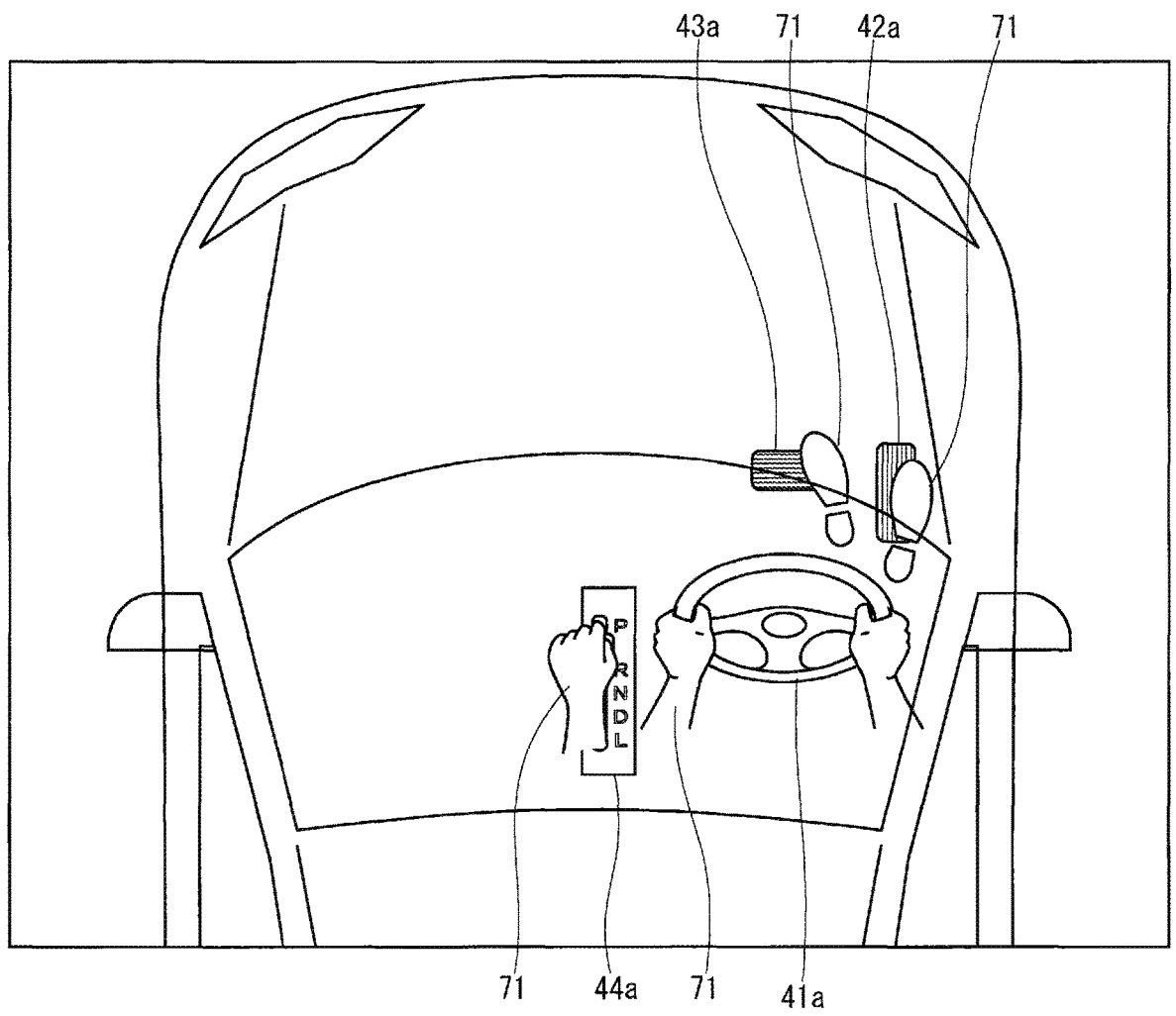
FIG. 20 illustrates a display example of the automatic driving information.

The layout of the steering wheel image 41a, the accelerator pedal image 42a, the brake pedal image 43a, and the shift lever image 44a on the screen of the display 20 is not limited to the above illustrations. As illustrated in FIG. 20, for example, a skeleton image obtained when the subject vehicle is viewed from on high may be displayed, and the steering wheel image 41a, the accelerator pedal image 42a, the brake pedal image 43a, and the shift lever image 44a may be disposed at the actual positions of the steering wheel 41, the accelerator pedal 42, the brake pedal 43, and the shift lever 44, respectively, in the skeleton image. Here, the manual-operation recalling image 71 is displayed at a superimposing position on each of the steering wheel image 41a, the accelerator pedal image 42a, the brake pedal image 43a, and the shift lever image 44a.

Embodiment 2

In Embodiment 1, the display controller 12 displays a manual-operation recalling image superimposed on each of the images of the manual driving devices (the steering wheel image 41a, the accelerator pedal image 42a, the brake pedal image 43a, and the shift lever image 44a) corresponding to the actuators in the manual control mode. The manual-operation recalling image is an image that recalls an operation performed by a person. In Embodiment 2, the display controller 12 further displays an automatic-operation recalling image superimposed on each of the images of the manual driving devices corresponding to the actuators in the automatic control mode. The automatic-operation recalling image is an image that recalls an operation performed by a machine. Examples of the automatic-operation recalling image include images of a mechanical hand (a robotic hand), a mechanical foot (a robotic foot), a mechanical handprint (a robotic handprint), a mechanical footprint (a robotic footprint), a mechanical part, and a remote controller.

Since the configuration and the operations of the vehicle information display control device 10 are basically the same as those according to Embodiment 1 (FIGS. 1 to 4), the description thereof will be omitted herein.

Figure 21:
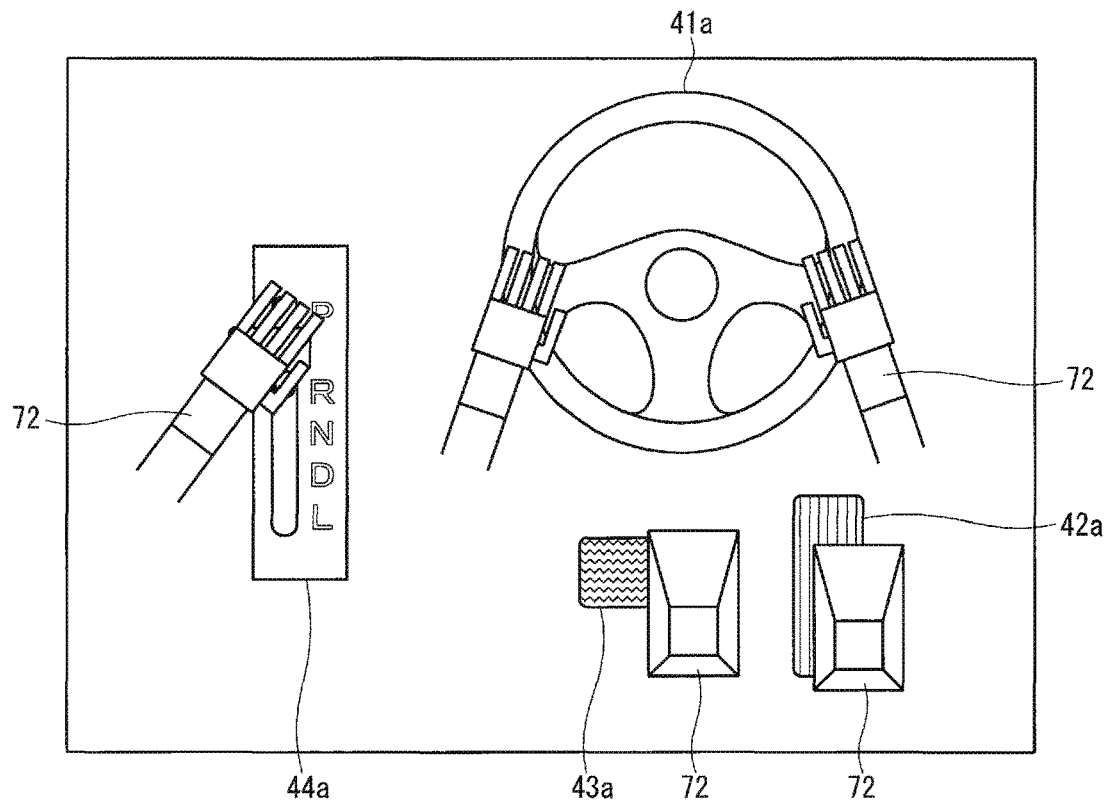
FIG. 21 illustrates a display example of the automatic driving information.

Next, the operations of the vehicle information display control device 10 according to Embodiment 2 will be described by giving specific display examples of the automatic driving information. For example, when all of the steering 51, the accelerator 52, the brake 53, and the shifter 54 are in the manual control mode, the display controller 12 performs the display (FIG. 5) similarly as according to Embodiment 1. When all of them are in the automatic control mode, the display controller 12 displays the automatic-operation recalling image 72 superimposed on each of the steering wheel image 41a, the accelerator pedal image 42a, the brake pedal image 43a, and the shift lever image 44a as illustrated in FIG. 21. In Embodiment 2, the automatic-operation recalling images 72 to be superimposed on the steering wheel image 41a and the shift lever image 44a are robotic hand images, whereas the automatic-operation recalling images 72 to be superimposed on the accelerator pedal image 42a and the brake pedal image 43a are robotic foot images.

Figure 22:
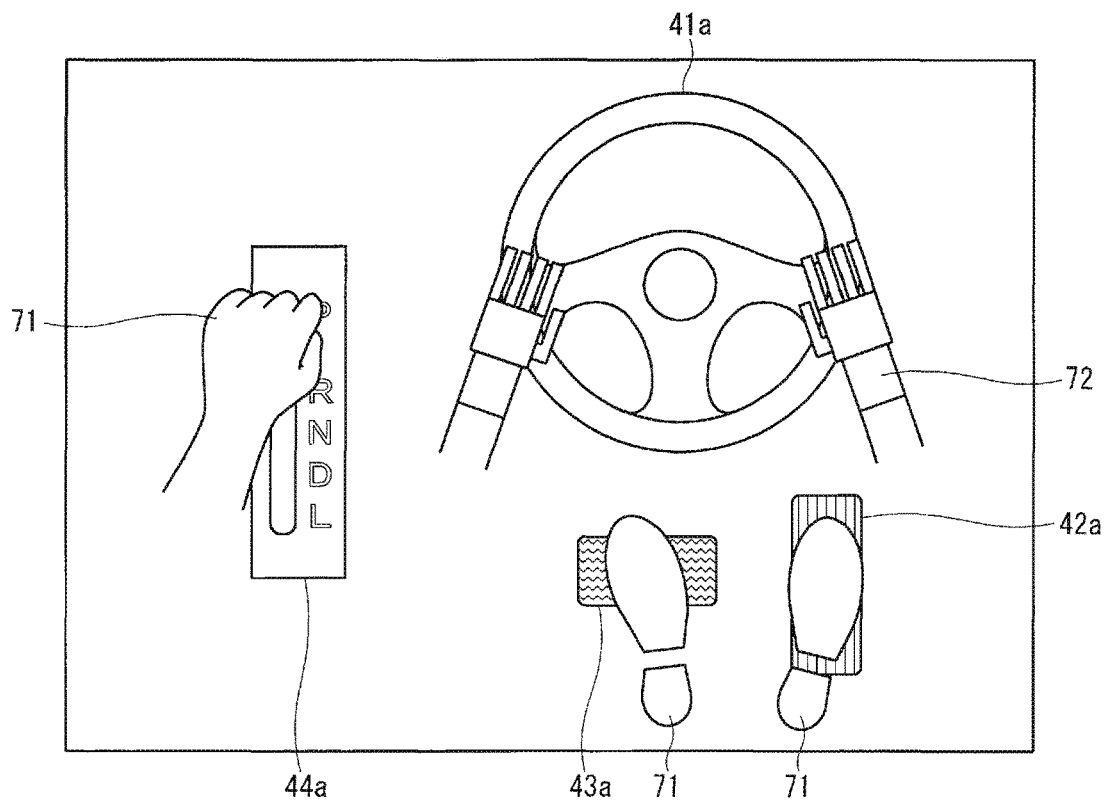
FIG. 22 illustrates a display example of the automatic driving information.

When there is a mix of the actuators in the manual control mode and the actuators in the automatic control mode, the display controller 12 displays the manual-operation recalling image 71 superimposed on each of the images of the manual driving devices corresponding to the actuators in the manual control mode, and the automatic-operation recalling image 72 superimposed on each of the images of the manual driving devices corresponding to the actuators in the automatic control mode. For example, when only the steering 51 is in the automatic control mode and the accelerator 52, the brake 53, and the shifter 54 are in the manual control mode, the display controller 12 displays the manual-operation recalling images 71 superimposed on the accelerator pedal image 42a, the brake pedal image 43a, and the shift lever image 44a and the automatic-operation recalling image 72 superimposed on the steering wheel image 41a as illustrated in FIG. 22. The image of the manual driving device corresponding to the actuator in the automatic control mode (the steering wheel image 41a) may be displayed translucently or with a broken line as illustrated in FIG. 23.

Figure 23:
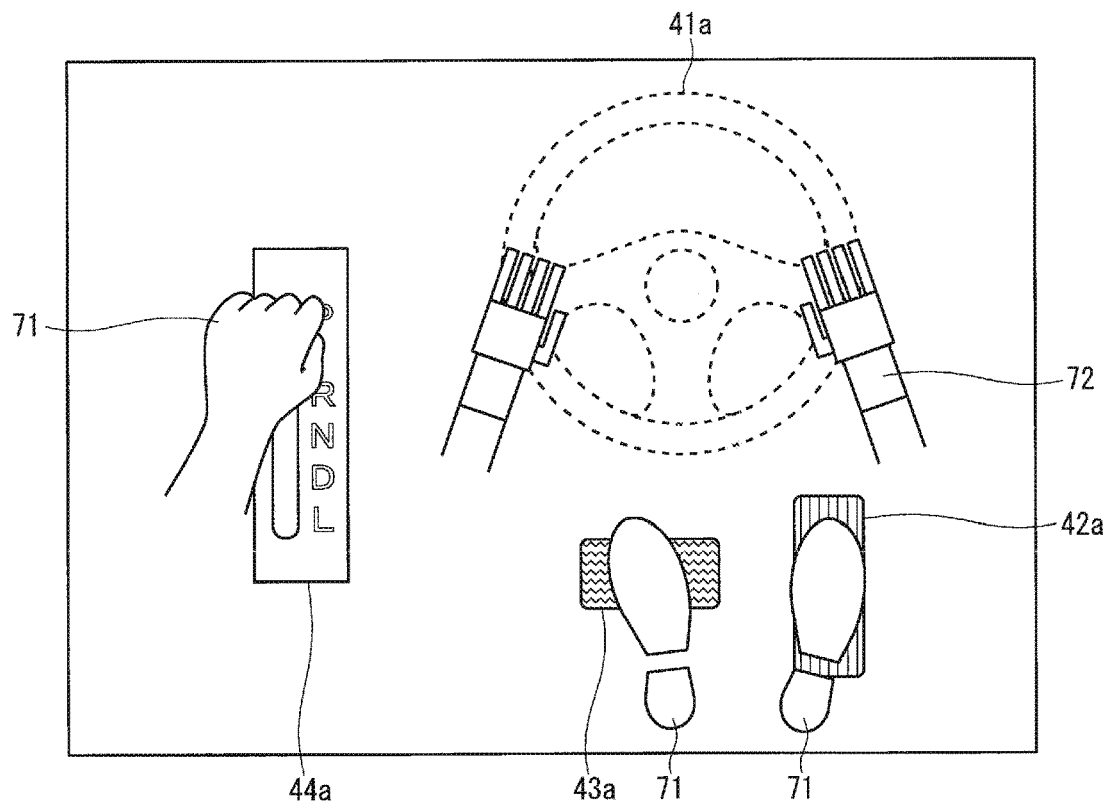
FIG. 23 illustrates a display example of the automatic driving information.
Figure 24:
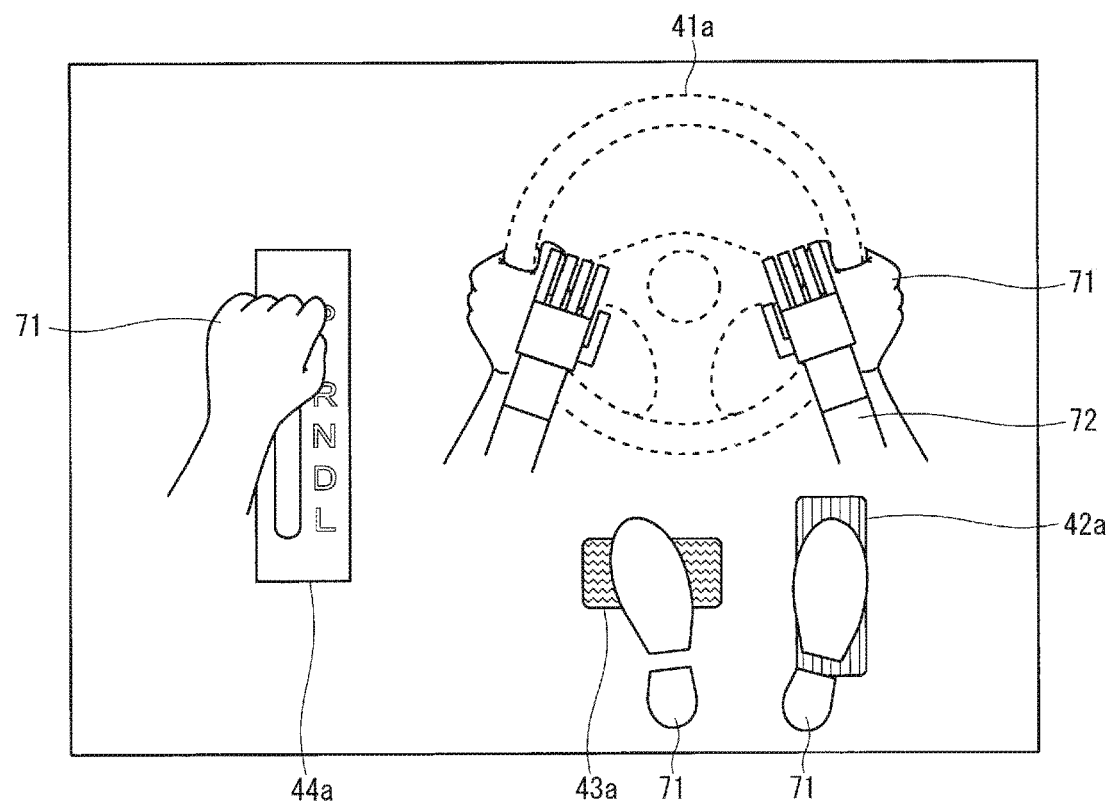
FIG. 24 illustrates a display example of the automatic driving information.

For example, when the steering 51 is in the automatic control mode of not allowing any intervention with a manual operation, only the automatic-operation recalling image 72 may be superimposed and displayed on the steering wheel image 41a as illustrated in FIG. 22 or 23. When the steering 51 is in the automatic control mode of switching to the manual control mode upon a manual operation, both the manual-operation recalling image 71 the automatic-operation recalling image 72 may be superimposed and displayed on the steering wheel image 41a as illustrated in FIG. 24.

Since the driving assistance system according to Embodiment 2 displays the automatic-operation recalling image 72 superimposed on each of the images of the manual driving devices (the steering wheel image 41a, the accelerator pedal image 42a, the brake pedal image 43a, and the shift lever image 44a) corresponding to the actuators in the automatic control mode, the driver can intuitively understand the control mode of each of the actuators from the display.

Embodiment 2 can also be combined with the operational flows in the automatic driving system 30 that are illustrated in FIG. 11. In Embodiment 1, the manual-operation recalling image 71 is blinked in the notification of Step S103 or Step S109. In Embodiment 2, the automatic-operation recalling image 72 may be displayed in a blinking manner instead. In the notification of Step S109, for example, the manual-operation recalling image 71 may be displayed with a spacing from each of the images of the manual driving devices corresponding to the actuators in the automatic control mode, and a distance or a time until switching the actuators to the manual control mode is required may be represented by the size of the spacing (i.e., the shorter the distance or the time is, the closer the manual-operation recalling image 71 is brought to the image of the manual driving device) as illustrated in FIG. 25.

Figure 26:
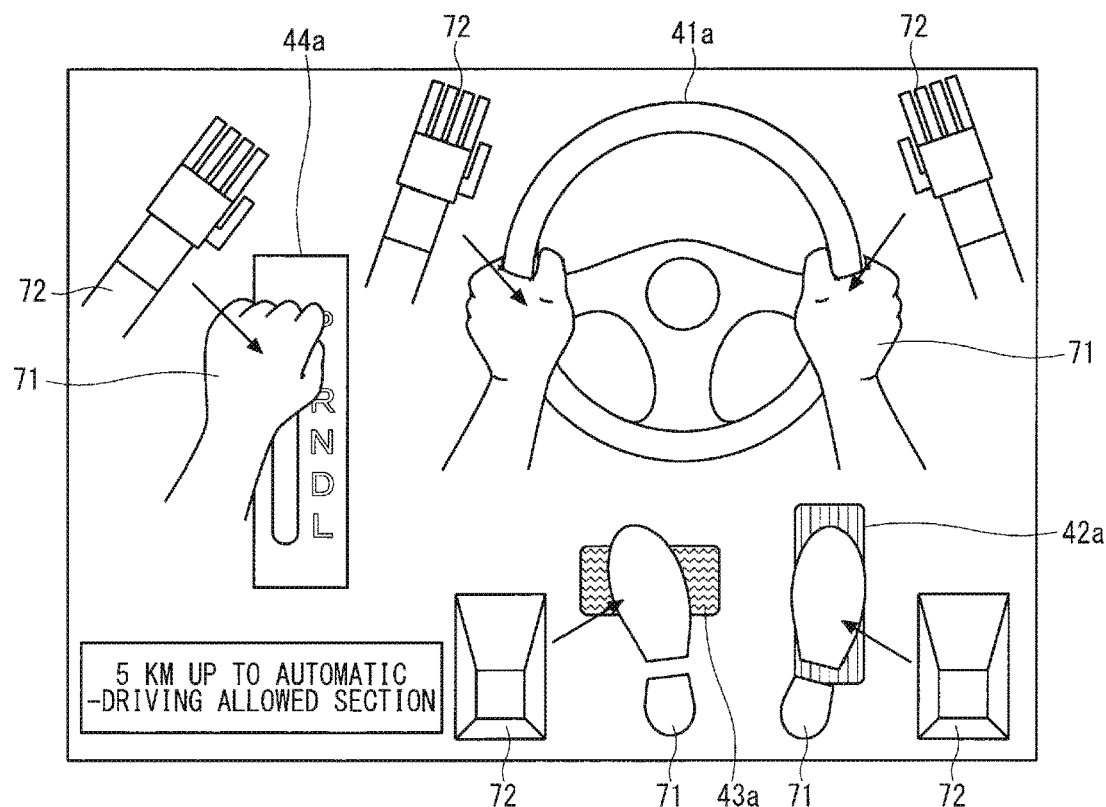
FIG. 26 illustrates a display example of the automatic driving information.

Prior to the notification in Step S103, when a notification of a distance or a time until the subject vehicle reaches a section at which the subject vehicle can be switched to the automatic driving mode (for example, a motorway) is displayed, for example, the automatic-operation recalling image 72 may be displayed with a spacing from each of the images of the manual driving devices corresponding to the actuators in the manual control mode, and a distance or a time until the actuators can be switched to the automatic control mode may be represented by the size of the spacing (i.e., the shorter the distance or the time is, the closer the automatic-operation recalling image 72 is brought to the image of the manual driving device) as illustrated in FIG. 26.

Figure 25:
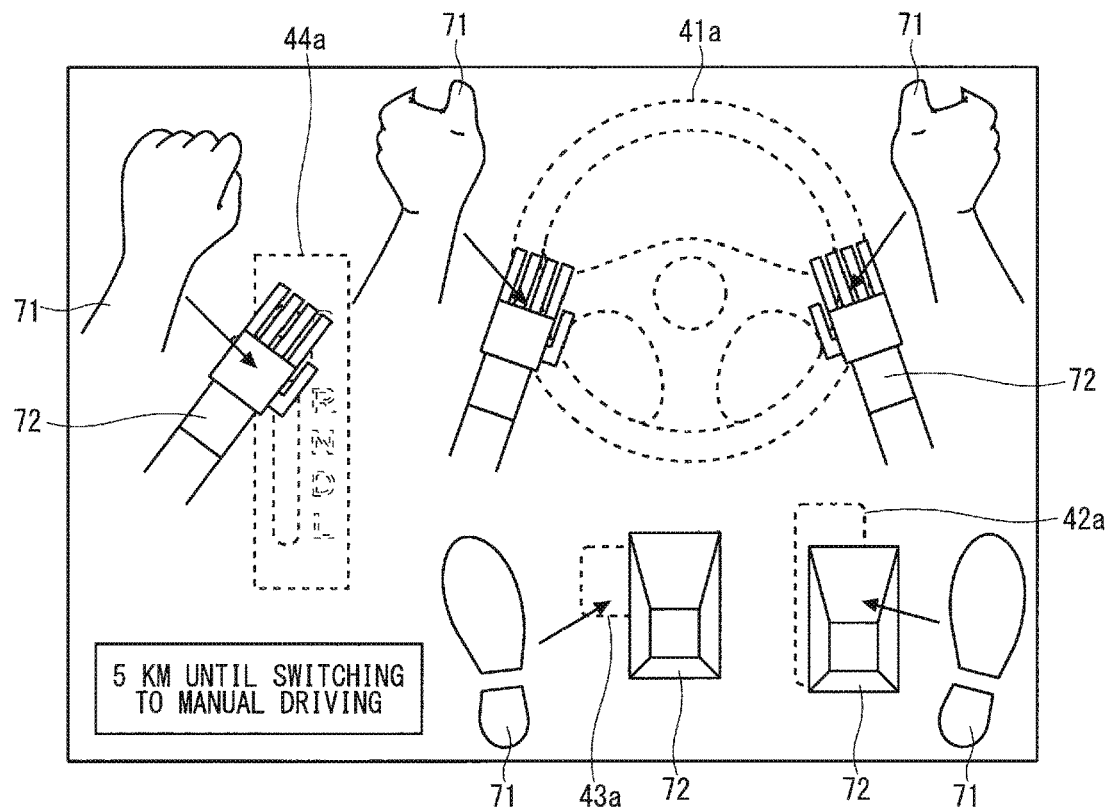
FIG. 25 illustrates a display example of the automatic driving information.

In the example of FIG. 25 or FIG. 26, change in the distance or the time may be represented by change in the color of an arrow, instead of moving the position of the manual-operation recalling image 71 or the automatic-operation recalling image 72. It is conceivable, in the example of FIG. 26, to display an arrow image 73 as illustrated in FIG. 27A between the automatic-operation recalling image 72 and the manual-operation recalling image 71 and to increase an area of a portion with the color identical to that of the automatic-operation recalling image 72 in the arrow image 73 as illustrated in FIG. 27B when a distance or a time up to a section at which the subject vehicle can be switched to the automatic driving mode is shorter. It is also possible to display the arrow image 73 divided into several portions as illustrated in FIG. 28A between the automatic-operation recalling image 72 and the manual-operation recalling image 71 and to increase the number of the portions with the color identical to that of the automatic-operation recalling image 72 in the arrow image 73 as illustrated in FIG. 28B when the distance or the time up to the section at which the subject vehicle can be switched to the automatic driving mode is shorter.

Although Embodiment 2 describes the examples using both the manual-operation recalling image 71 representing the manual control mode and the automatic-operation recalling image 72 representing the automatic control mode, only the automatic-operation recalling image 72 may be used. In other words, for example, when the actuator 50 is in the manual control mode, only the steering wheel image 41a, the accelerator pedal image 42a, the brake pedal image 43a, and the shift lever image 44a may be displayed as illustrated in FIG. 6. When the actuator 50 is in the automatic control mode, the automatic-operation recalling image 72 may be displayed on each of the steering wheel image 41a, the accelerator pedal image 42a, the brake pedal image 43a, and the shift lever image 44a as illustrated in FIG. 21. This also produces the same advantage of being able to intuitively understanding the control mode of each of the actuators from the display as according to Embodiments 1 and 2.

The manual-operation recalling image and the automatic-operation recalling image are not limited to the above ones. The manual-operation recalling image may adopt a design with which the driver becomes more familiar. The manual-operation recalling image may be an image or an illustration including, for example, an animal limb or a wing of a bird. The automatic-operation recalling image may be, for example, an image of genre different from that of the manual-operation recalling image, such as an image of an inorganic object, a mineral, a metal part, or a plant. The driver may select the manual-operation recalling image or the automatic-operation recalling image from among a plurality of images.

Obviously, the automatic driving to which the present invention is applicable includes automatic parking. The automatic driving also includes semi-automatic parking in which a steering wheel operation (steering control) is performed automatically but an accelerator operation needs to be performed manually, and quasi-automatic parking in which all of the steering, the accelerator, and the other actuators are controlled automatically.

Embodiments according to the present invention can be freely combined or appropriately modified and omitted within the scope of the invention.

Although this invention has been described in detail, the description is in all aspects illustrative and does not restrict the invention. Therefore, numerous modifications that have yet been exemplified will be devised without departing from the scope of this invention.

DESCRIPTION OF REFERENCE NUMERALS

10 vehicle information display control device, 11 automatic driving information obtaining unit, 12 display controller, 20 display, 30 automatic driving system, 31 driving-related information obtaining device, 32 HMI device, 33 automatic driving control device, 40 manual driving device, 41 steering wheel, 42 accelerator pedal, 43 brake pedal, 44 shift lever, 50 actuator, 51 steering, 52 accelerator, 53 brake, 54 shifter, 60 processing circuit, 61 processor, 62 memory, 41a steering wheel image, 42a accelerator pedal image, 43a brake pedal image, 44a shift lever image, 71 manual-operation recalling image, 72 automatic-operation recalling image.

The invention claimed is:

1. A vehicle information display control device, comprising:
   a processor to execute a program; and
   a memory to store the program which, when executed by the processor, performs processes of:
      obtaining automatic driving information including information indicating that each actuator of a vehicle is in a manual control mode or an automatic control mode; and
      causing a display to display an image based on the automatic driving information,
   wherein the processor causes the display to display an image of a manual driving device corresponding to each of the actuators and to display a manual-operation recalling image superimposed on the image of the manual driving device corresponding to one of the actuators that is in the manual control mode, the manual-operation recalling image being an image that recalls an operation performed by a person, and
   the processor causes the display to display translucently or with a broken line the image of the manual driving device corresponding to one of the actuators that is in the automatic control mode and to display the manual-operation recalling image superimposed on the image of the manual driving device corresponding to the one of the actuators, the one of the actuators being shifted to the manual control mode upon a manual operation.

2. The vehicle information display control device according to claim 1, wherein the manual-operation recalling image is an image representing one of a human hand, a human foot, a human handprint, a human footprint, a human handwear, and a human footwear.

3. The vehicle information display control device according to claim 1, wherein the processor causes the display to display the manual-operation recalling image superimposed on the image of the manual driving device corresponding to one of the actuators that is in the automatic control mode, the manual-operation recalling image being displayed translucently or with a broken line.

4. The vehicle information display control device according to claim 1, wherein the processor causes the display to display translucently or with a broken line the image of the manual driving device corresponding to one of the actuators that is in the automatic control mode.

5. The vehicle information display control device according to claim 1, wherein the processor causes the display to display an automatic-operation recalling image superimposed on the image of the manual driving device corresponding to one of the actuators that is in the automatic control mode, the automatic-operation recalling image being an image that recalls an operation performed by a machine.

6. The vehicle information display control device according to claim 1,
   wherein the automatic driving information further includes information indicating whether the one of the actuators that is in the manual control mode can be switched to the automatic control mode, and
   when the one of the actuators that is in the manual control mode can be switched to the automatic control mode, the processor blinks the manual-operation recalling image superimposed on the image of the manual driving device corresponding to the one of the actuators.

7. The vehicle information display control device according to claim 1,
   wherein the automatic driving information further includes information on a distance or a time until switching one of the actuators that is in the automatic control mode to the manual control mode is required, and
   when the distance or the time until switching the one of the actuators that is in the automatic control mode to the manual control mode is required is less than or equal to a predetermined threshold, the processor superimposes the manual-operation recalling image on the image of the manual driving device corresponding to the one of the actuators and causes the display to display the manual-operation recalling image in a blinking manner.

8. A vehicle information display control device, comprising:
- a processor to execute a program; and
- a memory to store the program which, when executed by the processor, performs processes of:
  - obtaining automatic driving information including information indicating that each actuator of a vehicle is in a manual control mode or an automatic control mode; and
  - causing a display to display an image based on the automatic driving information, wherein
- the processor causes the display to display an image of a manual driving device corresponding to each of the actuators and to display a manual-operation recalling image superimposed on the image of the manual driving device corresponding to one of the actuators that is in the manual control mode, and to display an automatic-operation recalling image superimposed on the image of the manual driving device corresponding to one of the actuators that is in the automatic control mode, the manual-operation recalling image being an image that recalls an operation performed by a person, the automatic-operation recalling image being an image that recalls an operation performed by a machine, and
- the processor causes the display to display, in addition to the automatic-operation recalling image, the manual-operation recalling image superimposed on the image of the manual driving device corresponding to the one of the actuators that is in the automatic control mode, the one of the actuators being shifted to the manual control mode upon a manual operation.

9. The vehicle information display control device according to claim 8, wherein the manual-operation recalling image is an image representing one of a human hand, a human foot, a human handprint, a human footprint, a human handwear, and a human footwear.

10. The vehicle information display control device according to claim 8, wherein the processor causes the display to display the manual-operation recalling image superimposed on the image of the manual driving device corresponding to one of the actuators that is in the automatic control mode, the manual-operation recalling image being displayed translucently or with a broken line.

11. The vehicle information display control device according to claim 8, wherein the processor causes the display to display translucently or with a broken line the image of the manual driving device corresponding to one of the actuators that is in the automatic control mode.

12. The vehicle information display control device according to claim 8, wherein
- the automatic driving information further includes information indicating whether the one of the actuators that is in the manual control mode can be switched to the automatic control mode, and
- when the one of the actuators that is in the manual control mode can be switched to the automatic control mode, the processor blinks the manual-operation recalling image superimposed on the image of the manual driving device corresponding to the one of the actuators.

13. The vehicle information display control device according to claim 8, wherein
- the automatic driving information further includes information on a distance or a time until switching one of the actuators that is in the automatic control mode to the manual control mode is required, and
- when the distance or the time until switching the one of the actuators that is in the automatic control mode to the manual control mode is required is less than or equal to a predetermined threshold, the processor superimposes the manual-operation recalling image on the image of the manual driving device corresponding to the one of the actuators and causes the display to display the manual-operation recalling image in a blinking manner.

14. A vehicle information display control device, comprising:
- a processor to execute a program; and
- a memory to store the program which, when executed by the processor, performs processes of:
  - obtaining automatic driving information including information indicating that each actuator of a vehicle is in a manual control mode or an automatic control mode; and
  - causing a display to display an image based on the automatic driving information, wherein
- the automatic driving information further includes information on a distance or a time until switching one or the actuators that is in the automatic control mode to the manual control mode is required,
- the processor causes the display to display an image of a manual driving device corresponding to each of the actuators and to display a manual-operation recalling image with a spacing from the image of the manual driving device corresponding to the one of the actuators that is in the automatic control mode, the manual-operation recalling image being an image that recalls an operation performed by a person, and
- the processor represents the distance or the time until switching the one of the actuators to the manual control mode is required, by a size of the spacing between the manual-operation recalling image and the image of the manual driving device corresponding to the one of the actuators.

15. The vehicle information display control device according to claim 14, wherein
- the automatic driving information further includes information on a distance or a time until the one or more of the actuators that is in the manual control mode can be switched to the automatic control mode, and
- the processor causes the display to display an automatic-operation recalling image with a spacing from the image of the manual driving device corresponding to the one of the actuators that is in the manual control mode, the automatic-operation recalling image being an image that recalls an operation performed by a machine, and
- the processor represents the distance or the time until the one of the actuators can be switched to the automatic control mode, by a size of the spacing between the automatic-operation recalling image and the image of the manual driving device corresponding to the one of the actuators.

16. A vehicle information display control device, comprising:
- a processor to execute a program; and
- a memory to store the program which, when executed by the processor, performs processes of:
  - obtaining automatic driving information including information indicating that each actuator of a vehicle is in a manual control mode or an automatic control mode; and
  - causing a display to display an image based on the automatic driving information, wherein the processor causes the display to display an image of a manual driving device corresponding to each of the actuators and to display an automatic-operation recalling image superimposed on the image of the manual driving device corresponding to one of the actuators that is in the automatic control mode, the automatic-operation recalling image being an image that recalls an operation performed by a machine, and wherein the processor causes the display to display, in addition to the automatic-operation recalling image, a manual-operation recalling image superimposed on the image of the manual driving device corresponding to the one of the actuators that is in the automatic control mode, the one of the actuators being shifted to the manual control mode upon a manual operation, the manual-operation recalling image being an image that recalls an operation performed by a person.

17. The vehicle information display control device according to claim 16, wherein the automatic-operation recalling image is an image representing one of a mechanical hand, a mechanical foot, a mechanical handprint, a mechanical footprint, a mechanical part, and a remote controller.

18. The vehicle information display control device according to claim 16, wherein the processor causes the display to display translucently or with a broken line the image of the manual driving device corresponding to the one of the actuators that is in the automatic control mode.

19. The vehicle information display control device according to claim 16, wherein the automatic driving information further includes information indicating whether one of the actuators that is in the manual control mode can be switched to the automatic control mode, and when the one of the actuators that is in the manual control mode can be switched to the automatic control mode, the processor superimposes the automatic-operation recalling image on the image of the manual driving device corresponding to the one of the actuators and causes the display to display the automatic-operation recalling image in a blinking manner.

* * * * *